United States Patent
Nguyen et al.

(10) Patent No.: US 11,946,343 B2
(45) Date of Patent: Apr. 2, 2024

(54) GEOMASS MEDIATED CARBON SEQUESTRATION MATERIAL PRODUCTION METHODS AND SYSTEMS FOR PRACTICING THE SAME

(71) Applicant: Blue Planet Systems Corporation, Los Gatos, CA (US)

(72) Inventors: Quynh Nguyen, Los Gatos, CA (US); Brent R. Constantz, Los Gatos, CA (US); Jacob Schneider, Los Gatos, CA (US); Seung-Hee Kang, Los Gatos, CA (US)

(73) Assignee: Blue Planet Systems Corporation, Los Gatos, CA (US)

( * ) Notice: Subject to any disclaimer, the term of this patent is extended or adjusted under 35 U.S.C. 154(b) by 548 days.

(21) Appl. No.: 17/261,678

(22) PCT Filed: Aug. 29, 2019

(86) PCT No.: PCT/US2019/048790
§ 371 (c)(1),
(2) Date: Jan. 20, 2021

(87) PCT Pub. No.: WO2020/047243
PCT Pub. Date: Mar. 5, 2020

(65) Prior Publication Data
US 2021/0262320 A1 Aug. 26, 2021

Related U.S. Application Data

(60) Provisional application No. 62/726,225, filed on Sep. 1, 2018.

(51) Int. Cl.
*E21B 41/00* (2006.01)
*B01D 53/14* (2006.01)
(Continued)

(52) U.S. Cl.
CPC ...... *E21B 41/0064* (2013.01); *B01D 53/1475* (2013.01); *B01D 53/62* (2013.01);
(Continued)

(58) Field of Classification Search
CPC .......... E21B 41/0064; B01D 2257/504; B01D 53/62; B01D 53/1475
See application file for complete search history.

(56) References Cited

U.S. PATENT DOCUMENTS 7,727,374 B2   6/2010   Jones
7,735,274 B2   6/2010   Constantz et al.
(Continued)

FOREIGN PATENT DOCUMENTS

CN   102114383 A   7/2011
CN   105174766 A   12/2015
(Continued)

OTHER PUBLICATIONS

Kelemen et al., Engineered carbon mineralization in ultramafic rocks for CO2 removal from air: Review and new insights, Chemical Geology, Sep. 2020, vol. 550, No. 119628, p. 1-22.
(Continued)

*Primary Examiner* — Zakiya W Bates
(74) *Attorney, Agent, or Firm* — Peter W. Schroen; Bret E. Field; Bozicevic, Field & Francis LLP

(57) ABSTRACT

Geomass mediated carbon dioxide ($CO_2$) sequestering methods and systems are provided. Aspects of the methods include contacting a gaseous source of $CO_2$ and an aqueous capture ammonia to produce a $CO_2$ sequestering product and an aqueous ammonium salt, and then contacting the aqueous ammonium salt liquid with a geomass, e.g., alkaline waste product, to regenerate the aqueous capture ammonia. Also provided are systems configured for carrying out the methods.

19 Claims, 5 Drawing Sheets

(51) Int. Cl.
B01D 53/62 (2006.01)
B01D 53/78 (2006.01)

(52) U.S. Cl.
CPC ........ B01D 53/78 (2013.01); *B01D 2252/102* (2013.01); *B01D 2252/103* (2013.01); *B01D 2257/504* (2013.01)

(56) References Cited

U.S. PATENT DOCUMENTS

| | | | |
|---|---|---|---|
| 7,749,476 | B2 | 7/2010 | Constantz et al. |
| 7,906,028 | B2 | 3/2011 | Constantz et al. |
| 7,914,685 | B2 | 3/2011 | Constantz et al. |
| 7,931,809 | B2 | 4/2011 | Constantz et al. |
| 8,333,944 | B2 | 12/2012 | Constantz et al. |
| 8,741,244 | B2 | 6/2014 | Jones |
| 8,795,508 | B2 | 8/2014 | Jones |
| 8,857,118 | B2 | 10/2014 | Constantz et al. |
| 9,139,472 | B2 | 9/2015 | Fernandez et al. |
| 9,359,221 | B2 | 6/2016 | Jones et al. |
| 9,902,652 | B2 | 2/2018 | Devenney et al. |
| 9,957,623 | B2 | 5/2018 | Gilliam et al. |
| 10,668,443 | B2 | 6/2020 | Kuppler et al. |
| 2009/0301352 | A1 | 12/2009 | Constantz et al. |
| 2010/0021362 | A1 | 1/2010 | Hunwick |
| 2010/0083828 | A1 | 4/2010 | Duncan et al. |
| 2010/0089110 | A1 | 4/2010 | Duncan et al. |
| 2010/0247410 | A1 | 9/2010 | Constantz et al. |
| 2011/0038774 | A1 | 2/2011 | Zhong |
| 2013/0287673 | A1 | 10/2013 | Wang et al. |
| 2014/0356267 | A1 | 12/2014 | Hunwick |
| 2015/0083607 | A1 | 3/2015 | Gilliam et al. |
| 2017/0274318 | A1 | 9/2017 | Constantz et al. |
| 2020/0129916 | A1* | 4/2020 | Constantz .......... B01D 53/1475 |

FOREIGN PATENT DOCUMENTS

| | | |
|---|---|---|
| JP | 2005-97072 A | 4/2005 |
| JP | 2010-519027 A | 6/2010 |
| KR | 20130055214 A | 5/2013 |
| WO | WO2007139392 A1 | 12/2007 |
| WO | WO2021228979 A1 | 11/2021 |

OTHER PUBLICATIONS

Maruyama et al., A New Concept of Calcium Carbonate Concrete using Demolished Concrete and CO2, Journal of Advanced Concrete Technology, Oct. 2021, vol. 19, No. 10, p. 1052-1060, abstract only.

The University of Tokyo, A concrete solution: Recycled concrete and CO2 from the air are made into a new building material, Oct. 8, 2021, Retrieved from: https://www.u-tokyo.ac.jp/focus/en/press/z0508_00190.html.

Chang et al., Calcium Carbonate Precipitation for CO2 Storage and Utilization: A Review of the Carbonate Crystallization and Polymorphism, Frontiers in Energy Research, Jul. 2017, vol. 5, No. 17, p. 1-12.

Sun et al., Polymorph and morphology of CaCO3 in relation to precipitation conditions in a bubbling system, Chinese Journal of Chemical Engineering, Apr. 2017, vol. 25, p. 1335-1342.

Czaplicka et al., Studies on the utilization of post-distillation liquid from Solvay process to carbon dioxide capture and storage, Apr. 2019, SN Applied Sciences, vol. 1, No. 431, p. 1-8.

Zhu et al., CO2 Absorption and Magnesium Carbonate Precipitation in MgCl2—NH3—NH4Cl Solutions: Implications for Carbon Capture and Storage, Minerals, Sep. 2017, vol. 7, No. 172, p. 1-23.

Li et al., Technical and Energy Performance of an Advanced, Aqueous Ammonia-Based CO2 Capture Technology for a 500 MW Coal-Fired Power Station, Environ. Sci. Technol., Jul. 2015, vol. 49, No. 16, p. 10243-10252.

Li et al., Process Modeling of an Advanced NH3 Abatement and Recycling Technology in the Ammonia-Based CO2 Capture Process, Environ. Sci. Technol., May 2014, vol. 48, No. 12, p. 7179-7186.

McLarnon et al., Testing of Ammonia Based CO2 Capture with Multi-Pollutant Control Technology, Energy Procedia, Feb. 2009, vol. 1, No. 1, p. 1027-1034.

Gunning et al., Production of lightweight aggregate from industrial waste and carbon dioxide, Waste Management, Jul. 2009, vol. 29, p. 2722-2728.

Chen et al., Producing vaterite by CO2 sequestration in the waste solution of chemical treatment of recycled concrete aggregates, Journal of Cleaner Production, Feb. 2017, vol. 149, p. 735-742.

Said et al., Pilot-scale experimental work on carbon dioxide sequestration using steelmaking slag, Applied Energy, Jun. 2016, vol. 177, p. 602-611.

Mattila et al., Production of Precipitated Calcium Carbonate from Steel Converter Slag and Other Calcium-Containing Industrial Wastes and Residues, Advances in Inorganic Chemistry, Chapter 10, 2014, vol. 66, ISSN 0898-8838, p. 347-384.

Sanna et al., A review of mineral carbonation technologies to sequester CO2, Chemical Society Reviews, vol. 43, No. 23, Jan. 2014, p. 8049-8080.

Sanna et al., Carbon dioxide capture and storage by pH swing aqueous mineralisation using a mixture of ammonium salts and antigorite source, Fuel, vol. 114, Aug. 2012, p. 153-161.

Lee et al., Continuous and simultaneous CO2 absorption, calcium extraction, and production of calcium carbonate using ammonium nitrate, Industrial & Engineering Chemistry Research, vol. 55, No. 45, Nov. 2016, p. 11795-11800.

* cited by examiner

GEOMASS MEDIATED CARBON SEQUESTRATION MATERIAL PRODUCTION METHODS AND SYSTEMS FOR PRACTICING THE SAME

CROSS-REFERENCE TO RELATED APPLICATIONS

Pursuant to 35 U.S.C. § 119(e), this application claims priority to the filing date of U.S. Provisional Application Ser. No. 62/726,225 filed on Sep. 1, 2018; the disclosure of which applications is herein incorporated by reference.

INTRODUCTION

Carbon dioxide ($CO_2$) is a naturally occurring chemical compound that is present in Earth's atmosphere as a gas. Sources of atmospheric $CO_2$ are varied, and include humans and other living organisms that produce $CO_2$ in the process of respiration, as well as other naturally occurring sources, such as volcanoes, hot springs, and geysers.

Additional major sources of atmospheric $CO_2$ include industrial plants. Many types of industrial plants (including cement plants, refineries, steel mills and power plants) combust various carbon-based fuels, such as fossil fuels and syngases. Fossil fuels that are employed include coal, natural gas, oil, petroleum coke and biofuels. Fuels are also derived from tar sands, oil shale, coal liquids, and coal gasification and biofuels that are made via syngas.

The environmental effects of $CO_2$ are of significant interest. $CO_2$ is commonly viewed as a greenhouse gas. The phrase "global warming" is used to refer to observed and continuing rise in the average temperature of Earth's atmosphere and oceans since the late 19th century. Because human activities since the industrial revolution have rapidly increased concentrations of atmospheric $CO_2$, anthropogenic $CO_2$ has been implicated in global warming and climate change, as well as increasing oceanic bicarbonate concentration. Ocean uptake of fossil fuel $CO_2$ is now proceeding at about 1 million metric tons of $CO_2$ per hour. Since the early 20th century, the Earth's mean surface temperature has increased by about 0.8° C. (1.4° F.), with about two-thirds of the increase occurring since 1980.

The effects of global warming on the environment and for human life are numerous and varied. Some effects of recent climate change may already be occurring. Rising sea levels, glacier retreat, Arctic shrinkage, and altered patterns of agriculture are cited as direct consequences, but predictions for secondary and regional effects include extreme weather events, an expansion of tropical diseases, changes in the timing of seasonal patterns in ecosystems, and drastic economic impact.

Projected climate changes due to global warming have the potential to lead to future large-scale and possibly irreversible effects at continental and global scales. The likelihood, magnitude, and timing is uncertain and controversial, but some examples of projected climate changes include significant slowing of the ocean circulation that transports warm water to the North Atlantic, large reductions in the Greenland and Western Antarctic Ice Sheets, accelerated global warming due to carbon cycle feedbacks in the terrestrial biosphere, and releases of terrestrial carbon from permafrost regions and methane from hydrates in coastal sediments.

While a matter of scientific debate, it is believed that excess atmospheric $CO_2$ is a significant contributing factor to global warming. Since the beginning of the Industrial Revolution, the concentration of $CO_2$ has increased by about 100 parts-per-million (ppm) (i.e., from 280 ppm to 380 ppm), and was recently observed to reach an average daily value of over 400 ppm. As such, there is great interest in the sequestration of $CO_2$, particularly in a manner sufficient to at least ameliorate the ever-increasing amounts of anthropogenic $CO_2$ that is present in the atmosphere.

Concerns over anthropogenic climate change and ocean acidification, have fueled an urgency to discover scalable, cost effective, methods of carbon capture and sequestration (CCS). Typically, methods of CCS separate pure $CO_2$ from complex flue streams, compress the purified $CO_2$, and finally inject it into underground saline reservoirs for geologic sequestration. These multiple steps are very energy and capital intensive. Carbonate mineralization is another method to sequester large amounts of $CO_2$, in gigaton (Gt, i.e., 1,000,000,000 tons) volumes, sustainably.

SUMMARY

Geomass mediated carbon dioxide ($CO_2$) sequestering methods and systems are provided. Aspects of the methods include contacting a gaseous source of $CO_2$ and an aqueous capture ammonia to produce a $CO_2$ sequestering product and an aqueous ammonium salt, and then contacting the aqueous ammonium salt liquid with a geomass, e.g., alkaline waste product, to regenerate the aqueous capture ammonia. Also provided are systems configured for carrying out the methods.

DETAILED DESCRIPTION

Figure 1:
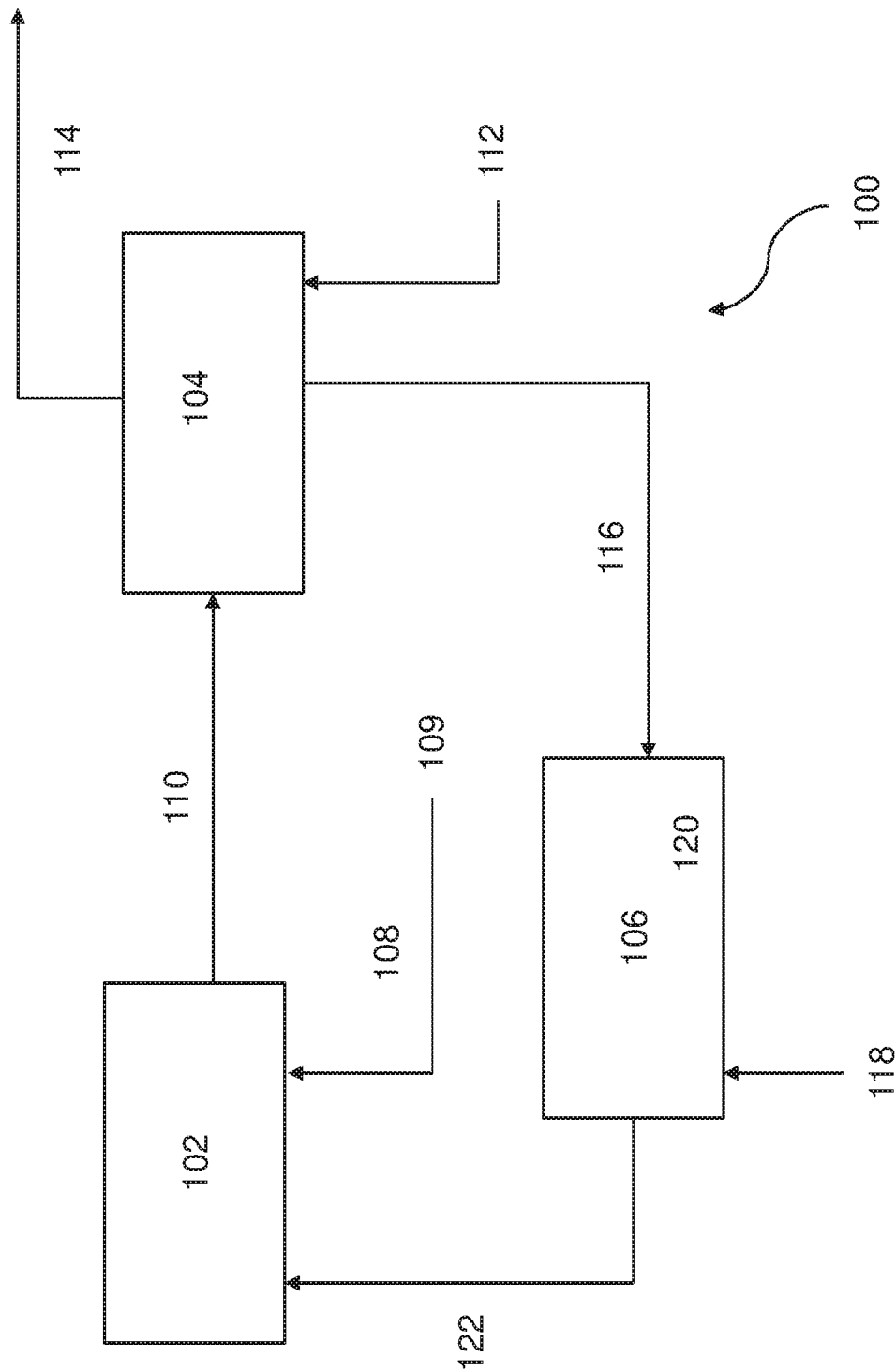
FIG. 1 provides a schematic representation of a system according to an embodiment of the invention.

Geomass mediated carbon dioxide ($CO_2$) sequestering methods and systems are provided. Aspects of the methods include contacting a gaseous source of $CO_2$ and an aqueous capture ammonia to produce a $CO_2$ sequestering product and an aqueous ammonium salt, and then contacting the aqueous ammonium salt liquid with a geomass, e.g., alkaline waste product, to regenerate the aqueous capture ammonia. Also provided are systems configured for carrying out the methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods

As summarized above, aspects of the invention include methods of using geomass, such as alkaline waste products, to produce carbon dioxide ($CO_2$) sequestering material. Accordingly, aspects of the invention include $CO_2$ sequestration processes, i.e., processes (methods, protocols, etc.) that result in $CO_2$ sequestration. By "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$ by producing a solid storage stable $CO_2$ sequestering product from an amount of $CO_2$, such that the $CO_2$ is sequestered. The solid storage stable $CO_2$ sequestering product is a storage stable composition that incorporates an amount of $CO_2$ into a storage stable form, such as an above-ground storage or underwater storage stable form, so that the $CO_2$ is no longer present as, or available to be, a gas in the atmosphere. Sequestering of $CO_2$ according to methods of the invention allows for long-term storage of $CO_2$ in a manner such that $CO_2$ does not become part of the atmosphere.

As summarized above, aspects of the methods include: contacting a gaseous source of $CO_2$ and an aqueous capture ammonia to produce a $CO_2$ sequestering product and an aqueous ammonium salt, and then contacting the aqueous ammonium salt with a geomass, e.g., alkaline waste product, to regenerate the aqueous capture ammonia. Each of these aspects of the methods is now further described in greater detail.

$CO_2$ Capture

Embodiments of the methods include contacting an aqueous capture liquid, such as an aqueous capture ammonia, with a gaseous source of $CO_2$ (i.e., a $CO_2$ containing gas) under conditions sufficient to produce an aqueous carbonate liquid, such as an aqueous ammonium carbonate.

The gaseous source of $CO_2$, i.e., the $CO_2$ containing gas, may be pure $CO_2$ or be combined with one or more other gasses and/or particulate components, depending upon the source, e.g., it may be a multi-component gas (i.e., a multi-component gaseous stream). In certain embodiments, the $CO_2$ containing gas is obtained from an industrial plant, e.g., where the $CO_2$ containing gas is a waste feed from an industrial plant. Industrial plants from which the $CO_2$ containing gas may be obtained, e.g., as a waste feed from the industrial plant, may vary. Industrial plants of interest include, but are not limited to, power plants and industrial product manufacturing plants, such as, but not limited to, chemical and mechanical processing plants, refineries, cement plants, steel plants, etc., as well as other industrial plants that produce $CO_2$ as a byproduct of fuel combustion or other processing step (such as calcination by a cement plant). Waste feeds of interest include gaseous streams that are produced by an industrial plant, for example as a secondary or incidental product, of a process carried out by the industrial plant.

Of interest in certain embodiments are waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Of interest in certain embodiments are waste streams produced by power plants that combust syngas, i.e., gas that is produced by the gasification of organic matter, e.g., coal, biomass, etc., where in certain embodiments such plants are integrated gasification combined cycle (IGCC) plants. Of interest in certain embodiments are waste streams produced by Heat Recovery Steam Generator (HRSG) plants. Waste streams of interest also include waste streams produced by cement plants. Cement plants whose waste streams may be employed in methods of the invention include both wet process and dry process plants, which plants may employ shaft kilns or rotary kilns, and may include pre-calciners. Each of these types of industrial plants may burn a single fuel, or may burn two or more fuels sequentially or simultaneously. A waste stream of interest is industrial plant exhaust gas, e.g., a flue gas. By "flue gas" is meant a gas that is obtained from the products of combustion from burning a fossil or biomass fuel that are then directed to the smokestack, also known as the flue of an industrial plant.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries are also useful sources of waste streams that include carbon dioxide.

Industrial waste gas streams may contain carbon dioxide as the primary non-air derived component, or may, especially in the case of coal-fired power plants, contain additional components (which may be collectively referred to as non-$CO_2$ pollutants) such as nitrogen oxides (NOx), sulfur oxides (SOx), and one or more additional gases.

Additional gases and other components may include CO, mercury and other heavy metals, and dust particles (e.g., from calcining and combustion processes). Additional non-$CO_2$ pollutant components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm; or 200 ppm to 500,000 ppm; or 200 ppm to 100,000 ppm; or 200 ppm to 10,000; or 200 ppm to 5,000 ppm; or 200 ppm to 2000 ppm; or 200 ppm to 1000 ppm; or 200 to 500 ppm; or 500 ppm to 1,000,000 ppm; or 500 ppm to 500,000 ppm; or 500 ppm to 100,000 ppm; or 500 ppm to 10,000; or 500 ppm to 5,000 ppm; or 500 ppm to 2000 ppm; or 500 ppm to 1000 ppm; or 1000 ppm to 1,000,000 ppm; or 1000 ppm to 500,000 ppm; or 1000 ppm to 100,000 ppm; or 1000 ppm to 10,000; or 1000 ppm to 5,000 ppm; or 1000 ppm to 2000 ppm; or 2000 ppm to 1,000,000 ppm; or 2000 ppm to 500,000 ppm; or 2000 ppm to 100,000 ppm; or 2000 ppm to 10,000; or 2000 ppm to 5,000 ppm; or 2000 ppm to 3000 ppm; or 5000 ppm to 1,000,000 ppm; or 5000 ppm to 500,000 ppm; or 5000 ppm to 100,000 ppm; or 5000 ppm to 10,000; or 10,000 ppm to 1,000,000 ppm; or 10.00 ppm to 500,000 ppm; or 10,000 ppm to 100,000 ppm; or 50,000 ppm to 1,000,000 ppm; or 50,000 ppm to 500,000 ppm; or 50,000 ppm to 100,000 ppm; or 100,000 ppm to 1,000,000 ppm; or 100,000 ppm to 500,000 ppm; or 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm.

The waste streams, particularly various waste streams of combustion gas, may include one or more additional non-$CO_2$ components, for example only, water, NOx (mononitrogen oxides: NO and $NO_2$), SOx (monosulfur oxides: SO, $SO_2$ and $SO_3$), VOC (volatile organic compounds), heavy metals such as, but not limited to, mercury, and particulate matter (particles of solid or liquid suspended in a gas). Flue gas temperature may also vary. In some embodiments, the temperature of the flue gas comprising $CO_2$ is from 0° C. to 2000° C., or 0° C. to 1000° C., or 0.degree ° C. to 500° C., or 0° C. to 100° C., or 0° C. to 50° C., or 10° C. to 2000° C., or 10° C. to 1000° C., or 10° C. to 500° C., or 10° C. to 100° C., or 10° C. to 50° C., or 50° C. to 2000° C., or 50° C. to 1000° C., or 50° C. to 500° C., or 50° C. to 100° C., or 100° C. to 2000° C., or 100° C. to 1000° C., or 100° C. to 500° C., or 500° C. to 2000° C., or 500° C. to 1000° C., or 500° C. to 800° C., or such as from 60° C. to 700° C., and including 100° C. to 400° C.

In some instances, the gaseous source of $CO_2$ is air and product gas produced by a direct air capture (DAC) system. DAC systems are a class of technologies capable of separating carbon dioxide $CO_2$ directly from ambient air. A DAC system is any system that captures $CO_2$ directly from air and generates a product gas that includes $CO_2$ at a higher concentration than that of the air that is input into the DAC system. The concentration of $CO_2$ in the air that is input to the DAC system may vary as $CO_2$ concentrations in the Earth's atmosphere are not homogeneous. In some instances 100 ppm or greater, such as 500 ppm or greater, including 5,000 ppm or greater, such that the location of the DAC system is more efficient at $CO_2$ capture in locations where $CO_2$ concentrations are relatively high, e.g., near congested freeway interchanges, bad commute corridors, in industrial zones of metropolitan areas and the like. While the concentration of $CO_2$ in the DAC generated gaseous source of $CO_2$ may vary, in some instances the concentration 1,000 ppm or greater, such as 10,000 ppm or greater, including 100,000 ppm or greater, where the product gas may not be pure $CO_2$, such that in some instances the product gas is 3% or more non-$CO_2$ constituents, such as 5% or more non-$CO_2$ constituents, including 10% or more non-$CO_2$ constituents. Non-$CO_2$ constituents that may be present in the product stream may be constituents that originate in the input air and/or from the DAC system. In some instances, the concentration of $CO_2$ in the DAC product gas ranges from 1,000 to 999,000 ppm, such as 1,000 to 10,000 ppm, or 10,000 to 100,000 ppm or 100,000 to 999,000 ppm. DAC generated gaseous streams have, in some embodiments, $CO_2$ present in amounts of 200 ppm to 1,000,000 ppm; or 200 ppm to 500,000 ppm; or 200 ppm to 100,000 ppm; or 200 ppm to 10,000; or 200 ppm to 5,000 ppm; or 200 ppm to 2,000 ppm;

or 200 ppm to 1,000 ppm; or 200 to 500 ppm; or 500 ppm to 1,000,000 ppm; or 500 ppm to 500,000 ppm; or 500 ppm to 100,000 ppm; or 500 ppm to 10,000; or 500 ppm to 5,000 ppm; or 500 ppm to 2,000 ppm; or 500 ppm to 1,000 ppm; or 1,000 ppm to 1,000,000 ppm; or 1,000 ppm to 500,000 ppm; or 1,000 ppm to 100,000 ppm; or 1,000 ppm to 10,000; or 1,000 ppm to 5,000 ppm; or 1,000 ppm to 2,000 ppm; or 2,000 ppm to 1,000,000 ppm; or 2,000 ppm to 500,000 ppm; or 2,000 ppm to 100,000 ppm; or 2,000 ppm to 10,000; or 2,000 ppm to 5,000 ppm; or 2,000 ppm to 3,000 ppm; or 5,000 ppm to 1,000,000 ppm; or 5,000 ppm to 500,000 ppm; or 5,000 ppm to 100,000 ppm; or 5,000 ppm to 10,000; or 10,000 ppm to 1,000,000 ppm; or 10.00 ppm to 500,000 ppm; or 10,000 ppm to 100,000 ppm; or 50,000 ppm to 1,000,000 ppm; or 50,000 ppm to 500,000 ppm; or 50,000 ppm to 100,000 ppm; or 100,000 ppm to 1,000,000 ppm; or 100,000 ppm to 500,000 ppm; or 200,000 ppm to 1000 ppm, including 200,000 ppm to 2,000 ppm, for example 180,000 ppm to 2,000 ppm, or 180,000 ppm to 5,000 ppm, also including 180,000 ppm to 10,000 ppm. The DAC product gas that is contacted with the aqueous capture liquid may be produced by any convenient DAC system. DAC systems are systems that extract $CO_2$ from the air using media that binds to $CO_2$ but not to other atmospheric chemicals (such as nitrogen and oxygen). As air passes over the $CO_2$ binding medium, $CO_2$ "sticks" to the binding medium. In response to a stimulus, e.g., heat, humidity, etc., the bound $CO_2$ may then be released from the binding medium resulting the production of a gaseous $CO_2$ containing product. DAC systems of interest include alkaline based systems, but are not limited to: amine based or hydroxide-based systems; $CO_2$ sorbent/temperature swing based systems, and $CO_2$ sorbent/temperature swing based systems. In some instances, the DAC system is an amine based or a hydroxide based system, in which $CO_2$ is separated from air by contacting the air with an aqueous amine or an aqueous hydroxide liquid to produce an aqueous carbonate, such as an aqueous ammonium carbonate. Examples of hydroxide based DAC systems include, but are not limited to, those described in PCT published application Nos. WO/2009/155539; WO/2010/022339; WO/2013/036859; and WO/2013/120024; the disclosures of which are herein incorporated by reference. In some instances, the DAC system is a $CO_2$ sorbent based system, in which $CO_2$ is separated from air by contacting the air with sorbent, such as an amine sorbent, followed by release of the sorbent captured $CO_2$ by subjecting the sorbent to one or more stimuli, e.g., change in temperature, change in humidity, etc. Examples of such DAC systems include, but are not limited to, those described in PCT published application Nos. WO/2005/108297; WO/2006/009600; WO/2006/023743; WO/2006/036396; WO/2006/084008; WO/2007/016271; WO/2007/114991; WO/2008/042919; WO/2008/061210; WO/2008/131132; WO/2008/144708; WO/2009/061836; WO/2009/067625; WO/2009/105566; WO/2009/149292; WO/2010/019600; WO/2010/022399; WO/2010/107942; WO/2011/011740; WO/2011/137398; WO/2012/106703; WO/2013/028688; WO/2013/075981; WO/2013/166432; WO/2014/170184; WO/2015/103401; WO/2015/185434; WO/2016/005226; WO/2016/037668; WO/2016/162022; WO/2016/164563; WO/2016/161998; WO/2017/184652; and WO/2017/009241; the disclosures of which are herein incorporated by reference.

As summarized above, an aqueous capture liquid is contacted with the gaseous source of $CO_2$ under conditions sufficient to produce a $CO_2$ sequestering material. The $CO_2$ sequestering material may be produced from the gaseous source of $CO_2$ and capture liquid by using a multistep or single step protocol, as desired. For example, in some embodiments, combination of the $CO_2$ capture liquid and gaseous source of $CO_2$ results in production of an aqueous carbonate, which aqueous carbonate is then subsequently contacted with a divalent cation source, e.g., a $Ca^{2+}$ and/or $Mg^{2+}$ source, to produce the $CO_2$ sequestering material. In yet other embodiments, a one-step $CO_2$ gas absorption carbonate precipitation protocol is employed.

The concentration of ammonia in the aqueous capture ammonia may vary, where in some instances the aqueous capture ammonia includes ammonia ($NH_3$) at a concentration ranging from 0.1 to 20.0 moles per liter (M), and in some instances 0.1 to 5.0 M, such as 0.1 to 4.0 M, e.g., 4.0 M, while in other instances from 2 to 20 M, such as 4 to 20 M. The aqueous capture ammonia may include any convenient water. Waters of interest from which the aqueous capture ammonia may be produced include, but are not limited to, freshwaters, seawaters, brine waters, produced waters and waste waters. In some instances the water of interest may be recycled water from a wastewater treatment plant, wherein the recycled water already includes $NH_3$ at a concentration ranging from 10 to 500 ppm, and in some instances 10 to 100 ppm, such as 10 to 90 ppm, while in other instances from 100 to 500 ppm, such as from 150 to 500 ppm $NH_3$. The pH of the aqueous capture ammonia may vary, ranging in some instances from 10.0 to 13.5, such as 10.0 to 13.0, including 10.5 to 12.5. Further details regarding aqueous capture ammonias of interest are provided in PCT published application No. WO/2017/165849; the disclosure of which is herein incorporated by reference.

The $CO_2$ containing gas, e.g., as described above, may be contacted with the aqueous capture liquid, e.g., aqueous capture ammonia, using any convenient protocol. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, scrubbers, absorbers or packed column reactors, and the like, as may be convenient. In some instances, the contacting protocol may use a conventional absorber or an absorber froth column, such as those described in U.S. Pat. Nos. 7,854,791; 6,872,240; and 6,616,733; and in US Patent Application Publication US/2012/0237420; the disclosures of which are herein incorporated by reference. The process may be a batch or continuous process.

In some instances, the gaseous source of $CO_2$ is contacted with the liquid using a microporous membrane contactor. Microporous membrane contactors of interest include a microporous membrane present in a suitable housing, where the housing includes a gas inlet and a liquid inlet, as well a gas outlet and a liquid outlet. The contactor is configured so that the gas and liquid contact opposite sides of the membrane in a manner such that molecule may dissolve into the liquid from the gas via the pores of the microporous membrane. The membrane may be configured in any convenient format, where in some instances the membrane is configured in a hollow fiber format. Hollow fiber membrane reactor formats which may be employed include, but are not limited to, those described in U.S. Pat. Nos. 7,264,725 and 5,695,545; the disclosures of which are herein incorporated by reference. In some instances, the microporous hollow fiber membrane contactor that is employed is a Liqui-Cel® hollow fiber membrane contactor (available from 3M Company), which membrane contactors include polypropylene membrane contactors and polyolefin membrane contactors.

Contact between the capture liquid and the $CO_2$-containing gas occurs under conditions such that a substantial portion of the $CO_2$ present in the $CO_2$-containing gas goes into solution, e.g., to produce bicarbonate ions. By substantial portion is meant 10% or more, such as 50% or more, including 80% or more.

The temperature of the capture liquid that is contacted with the $CO_2$-containing gas may vary. In some instances, the temperature ranges from −1.4 to 100° C., such as 20 to 80° C. and including 40 to 70° C. In some instances, the temperature may range from −1.4 to 50° C. or higher, such as from −1.1 to 45° C. or higher. In some instances, cooler temperatures are employed, where such temperatures may range from −1.4 to 4° C., such as −1.1 to 0° C. In some instances, warmer temperatures are employed. For example, the temperature of the capture liquid in some instances may be 25° C. or higher, such as 30° C. or higher, and may in some embodiments range from 25 to 50° C., such as 30 to 40° C.

The $CO_2$-containing gas and the capture liquid are contacted at a pressure suitable for production of a desired $CO_2$ charged liquid. In some instances, the pressure of the contact conditions is selected to provide for optimal $CO_2$ absorption, where such pressures may range from 1 ATM to 100 ATM, such as 1 to 50 ATM, e.g., 20-30 ATM or 1 ATM to 10 ATM. Where contact occurs at a location that is naturally at 1 ATM, the pressure may be increased to the desired pressure using any convenient protocol. In some instances, contact occurs where the optimal pressure is present, e.g., at a location under the surface of a body of water, such as an ocean or sea.

Contact is carried out in manner sufficient to produce an aqueous ammonium carbonate. The aqueous ammonium carbonate may vary, where in some instances the aqueous ammonium carbonate comprises at least one of ammonium carbonate and ammonium bicarbonate and in some instances comprises both ammonium carbonate and ammonium bicarbonate. The aqueous ammonium bicarbonate may be viewed as a dissolved inorganic carbon (DIC) containing liquid. As such, in charging the aqueous capture ammonia with $CO_2$, a DAC generated $CO_2$ containing gas may be contacted with $CO_2$ capture liquid under conditions sufficient to produce DIC in the $CO_2$ capture liquid, i.e., to produce a DIC containing liquid. The DIC is the sum of the concentrations of inorganic carbon species in a solution, represented by the equation: $DIC=[CO_2^*]+[HCO_3^-]+[CO_3^{2-}]$, where $[CO_2^*]$ is the sum of carbon dioxide ($[CO_2]$) and carbonic acid ($[H_2CO_3]$) concentrations, $[HCO_3^-]$ is the bicarbonate concentration (which includes ammonium bicarbonate) and $[CO_3^{2-}]$ is the carbonate concentration (which includes ammonium carbonate) in the solution. The DIC of the aqueous media may vary, and in some instances may be 5,000 ppm carbon or greater, such as 10,000 ppm carbon or greater, including 15,000 ppm carbon or greater. In some instances, the DIC of the aqueous media may range from 5,000 to 50,000 ppm carbon, such as 7,500 to 15,000 ppm carbon, including 8,000 to 12,000 ppm carbon. The amount of $CO_2$ dissolved in the liquid may vary, and in some instances ranges from 0.05 to 40 mM, such as 1 to 35 mM, including 25 to 30 mM. The pH of the resultant DIC containing liquid may vary, ranging in some instances from 4 to 12, such as 6 to 11 and including 7 to 10, e.g., 8 to 8.5.

Where desired, the $CO_2$ containing gas is contacted with the capture liquid in the presence of a catalyst (i.e., an absorption catalyst, either hetero- or homogeneous in nature) that mediates the conversion of $CO_2$ to bicarbonate. Of interest as absorption catalysts are catalysts that, at pH levels ranging from 8 to 10, increase the rate of production of bicarbonate ions from dissolved $CO_2$. The magnitude of the rate increase (e.g., as compared to control in which the catalyst is not present) may vary, and in some instances is 2-fold or greater, such as 5-fold or greater, e.g., 10-fold or greater, as compared to a suitable control. Further details regarding examples of suitable catalysts for such embodiments are found in U.S. Pat. No. 9,707,513, the disclosure of which is herein incorporated by reference.

In some embodiments, the resultant aqueous ammonium carbonate is a two phase liquid which includes droplets of a liquid condensed phase (LCP) in a bulk liquid, e.g., bulk solution. By "liquid condensed phase" or "LCP" is meant a phase of a liquid solution which includes bicarbonate ions wherein the concentration of bicarbonate ions is higher in the LCP phase than in the surrounding, bulk liquid. LCP droplets are characterized by the presence of a meta-stable bicarbonate-rich liquid precursor phase in which bicarbonate ions associate into condensed concentrations exceeding that of the bulk solution and are present in a non-crystalline solution state. The LCP contains all of the components found in the bulk solution that is outside of the interface. However, the concentration of the bicarbonate ions is higher than in the bulk solution. In those situations where LCP droplets are present, the LCP and bulk solution may each contain ion-pairs and pre-nucleation clusters (PNCs). When present, the ions remain in their respective phases for long periods of time, as compared to ion-pairs and PNCs in solution. Further details regarding LCP containing liquids are provided in U.S. Pat. No. 9,707,513, the disclosure of which is herein incorporated by reference.

Production of Solid $CO_2$ Sequestering Carbonate

As reviewed above, both multistep and single step protocols may be employed to produce the $CO_2$ sequestering carbonate material from the $CO_2$ containing gas the aqueous capture ammonia. For example, in some embodiments the product aqueous ammonium carbonate is forwarded to a $CO_2$ sequestering carbonate production module, where divalent cations, e.g., $Ca^{2+}$ and/or $Mg^{2+}$, are combined with the aqueous ammonium carbonate to produce the $CO_2$ sequestering carbonate. In yet other instances, aqueous capture ammonia includes a source of divalent cations, e.g., $Ca^{2+}$ and/or $Mg^{2+}$, such that aqueous ammonium carbonate combines withe divalent cations as it is produced to result in production of a $CO_2$ sequestering carbonate.

Accordingly, in some embodiments, following production of an aqueous carbonate, such as an aqueous ammonium carbonate, e.g., as described above, the aqueous carbonate is subsequently combined with a cation source under conditions sufficient to produce a solid $CO_2$ sequestering carbonate. Cations of different valances can form solid carbonate compositions (e.g., in the form of carbonate minerals). In some instances, monovalent cations, such as sodium and potassium cations, may be employed. In other instances, divalent cations, such as alkaline earth metal cations, e.g., calcium ($Ca^{2+}$) and magnesium ($Mg^{2+}$) cations, may be employed. When cations are added to the aqueous carbonate, precipitation of carbonate solids, such as amorphous calcium carbonate ($CaCO_3$) when the divalent cations include $Ca^{2+}$, may be produced with a stoichiometric ratio of one carbonate-species ion per cation.

Any convenient cation source may be employed in such instances. Cation sources of interest include, but are not limited to, the brine from water processing facilities such as sea water desalination plants, brackish water desalination plants, groundwater recovery facilities, wastewater facilities, blowdown water from facilities with cooling towers, and the like, which produce a concentrated stream of solution high in cation contents. Also of interest as cation sources are naturally occurring sources, such as but not limited to native seawater and geological brines, which may have varying cation concentrations and may also provide a ready source of cations to trigger the production of carbonate solids from the aqueous ammonium carbonate. In some instances, the cation source may be a waste product of another step of the process, e.g., a calcium salt (such as $CaCl_2$) produced during regeneration of ammonia from the aqueous ammonium salt.

In yet other embodiments, the aqueous capture ammonia includes cations, e.g., as described above. The cations may be provided in the aqueous capture ammonia using any convenient protocol. In some instances, the cations present in the aqueous capture ammonia are derived from a geomass used in regeneration of the aqueous capture ammonia from an aqueous ammonium salt. In addition and/or alternatively, the cations may be provided by combining an aqueous capture ammonia with a cation source, e.g., as described above.

The product $CO_2$ sequestering carbonate compositions produced by embodiments of methods of the invention may vary greatly. The precipitated product may include one or more different carbonate compounds, such as two or more different carbonate compounds, e.g., three or more different carbonate compounds, five or more different carbonate compounds, etc., including non-distinct, amorphous carbonate compounds. Carbonate compounds of precipitated products of the invention may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n \cdot H_2O$, where there are one or more structural waters in the molecular formula. The amount of carbonate in the product, as determined by coulometry using the protocol described as coulometric titration or by loss on ignition (LOI) using the standard test methods for LOI of solid combustion residues per ASTM D7348, may be 40% or higher, such as 70% or higher, including 80% or higher.

The carbonate compounds of the precipitated products may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3$). Magnesium carbonate minerals of interest include, but are not limited to magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), hydromagnesite, and amorphous magnesium calcium carbonate ($MgCO_3$). Calcium magnesium carbonate minerals of interest include, but are not limited to dolomite ($CaMg(CO_3)_2$), huntite ($Mg_3Ca(CO_3)_4$) and sergeevite ($Ca_2Mg(CO_3)_{13} \cdot H_2O$). The carbonate compounds of the product may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the precipitate ranges from 1.5-5 to 1, such as 2-4 to 1 including 2-3 to 1. In some instances, the precipitated product may include hydroxides, such as divalent metal ion hydroxides, e.g., calcium and/or magnesium hydroxides.

Further details regarding carbonate production and methods of using the carbonated produced thereby are provided in: U.S. application Ser. No. 14/204,994 published as US-2014-0322803-A1; 14/214,129 published as US 2014-0271440 A1; Ser. No. 14/861,996 published as US 2016-0082387 A1; as well as U.S. Pat. Nos. 9,707,513; 9,714,406 and 9,993,799; the disclosures of which are herein incorporated by reference.

In some instances, carbonate production occurs in a continuous fashion, e.g., as described in U.S. Pat. No. 9,993,799, the disclosure of which is herein incorporated by reference. In some such instances, carbonate production may occur in the presence of a seed structure. By seed structure is meant a solid structure or material that is present flowing liquid, e.g., in the material production zone, prior to divalent cation introduction into the liquid. By "in association with" is meant that the material is produced on at least one of a surface of or in a depression, e.g., a pore, crevice, etc., of the seed structure. In such instances, a composite structure of the carbonate material and the seed structure is produced. In some instances, the product carbonate material coats a portion, if not all of, the surface of a seed structure, e.g., a carbonate coated seed structure. In some instances, the product carbonate materials fills in a depression of the seed structure, e.g., a pore, crevice, fissure, etc.

Seed structures may vary widely as desired. The term "seed structure" is used to describe any object upon and/or in which the product carbonate material forms. Seed structures may range from singular objects or particulate compositions, as desired. Where the seed structure is a singular object, it may have a variety of different shapes, which may be regular or irregular, and a variety of different dimensions. Shapes of interest include, but are not limited to, rods, meshes, blocks, etc. Also of interest are particulate compositions, e.g., granular compositions, made up of a plurality of particles. Where the seed structure is a particulate composition, the dimensions of particles may vary, ranging in some instances from 0.01 to 1,000,000 µm, such as 0.1 to 100,000 µm.

The seed structure may be made up of any convenient material or materials. Materials of interest include both carbonate materials, such as described above, as well as non-carbonate materials. The seed structures may be naturally occurring, e.g., naturally occurring sands, shell fragments from oyster shells or other carbonate skeletal allochems, gravels, etc., or man-made, such as pulverized rocks, ground blast furnace slag, fly ash, cement kiln dust, red mud, returned concrete, recycled concrete, demolished concrete and the like. For example, the seed structure may be a granular composition, such as sand, which is coated with the carbonate material during the process, e.g., a white carbonate material or colored carbonate material, e.g., as described above.

In some instances, seed structure may be coarse aggregates, such as friable Pleistocene coral rock, e.g., as may be obtained from tropical areas (e.g., Florida) that are too weak to serve as aggregate for concrete. In this case the friable coral rock can be used as a seed, and the solid $CO_2$ sequestering carbonate mineral may be deposited in the internal pores, making the coarse aggregate suitable for use in concrete, allowing it to pass the Los Angeles abrasion test per AASHTO 96 and ASTMs C131 or C535. In some instances, where a lightweight aggregate is desired, the outer surface will only be penetrated by the solution of deposition, leaving the inner core relatively 'hollow' making a light weight aggregate for use in light weight concrete.

Production of Materials from the $CO_2$ Sequestering Carbonate Product

The product carbonate material may be further used, manipulated and/or combined with other compositions to produce a variety of end-use materials. In certain embodiments, the product carbonate composition is refined (i.e., processed) in some manner. Refinement may include a variety of different protocols. In certain embodiments, the product is subjected to mechanical refinement, e.g., grinding, in order to obtain a product with desired physical properties, e.g., particle size, etc. In certain embodiments, the product is combined with a hydraulic cement, e.g., as a sand, a gravel, as an aggregate, etc., e.g., to produce final product, e.g., concrete or mortar.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls etc. Further examples and details regarding formed building materials include those described in U.S. Pat. No. 7,771,684; the disclosure of which is herein incorporated by reference.

Also of interest are non-cementitious manufactured items that include the product of the invention as a component. Non-cementitious manufactured items of the invention may vary greatly. By non-cementitious is meant that the compositions are not hydraulic cements. As such, the compositions are not dried compositions that, when combined with a setting fluid, such as water, set to produce a stable product. Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. Pat. No. 7,829,053; the disclosure of which is herein incorporated by reference.

Aggregates

As summarized above, the methods and systems of the invention may be employed to produce carbonate coated seed structures, e.g., carbonate coated aggregates or, optionally without a seed structure, e.g., pure carbonate aggregates, rocks, etc., for use in concretes and other applications. The carbonate coated aggregates may be conventional or light-weight aggregates.

Aspects of the invention include $CO_2$ sequestering aggregate compositions. The $CO_2$ sequestering aggregate compositions include aggregate particles having a core and a $CO_2$ sequestering carbonate coating on at least a portion of a surface of the core. The $CO_2$ sequestering carbonate coating is made up of a $CO_2$ sequestering carbonate material, e.g., as described above. The $CO_2$ sequestering carbonate material that is present in coatings of the coated particles of the subject aggregate compositions may vary. In some instances, the isotopic profile of the core of the aggregate differs from the carbonate coating of the aggregate, such that the aggregate has a carbonate coating with a first isotopic profile and a core with a second isotopic profile that is different from the first.

In some instances, the carbonate material is a highly reflective microcrystalline/amorphous carbonate material. The microcrystalline/amorphous materials present in coatings of the invention may be highly reflective. As the materials may be highly reflective, the coatings that include the same may have a high total surface reflectance (TSR) value. TSR may be determined using any convenient protocol, such as ASTM E1918 Standard Test Method for Measuring Solar Reflectance of Horizontal and Low-Sloped Surfaces in the Field (see also R. Levinson, H. Akbari, P. Berdahl, Measuring solar reflectance—Part II: review of practical methods, LBNL 2010). In some instances, the backsheets exhibit a TSR value ranging from Rg; 0=0.0 to Rg; 0,=1.0, such as Rg; 0,=0.25 to Rg; 0,=0.99, including Rg; 0,=0.40 to Rg; 0,=0.98, e.g., as measured using the protocol referenced above.

In some instances, the coatings that include the carbonate materials are highly reflective of near infrared (NIR) light, ranging in some instances from 10 to 99%, such as 50 to 99%. By NIR light is meant light having a wavelength ranging from 700 nanometers (nm) to 2.5 millimeters (mm). NIR reflectance may be determined using any convenient protocol, such as ASTM C1371 Standard Test Method for Determination of Emittance of Materials Near Room Temperature Using Portable Emissometers or ASTM G173 Standard Tables for Reference Solar Spectral Irradiances: Direct Normal and Hemispherical on 37° Tilted Surface. In some instances, the coatings exhibit a NIR reflectance value ranging from Rg; 0=0.0 to Rg; 0=1.0, such as Rg; 0=0.25 to Rg; 0=0.99, including Rg; 0=0.40 to Rg; 0=0.98, e.g., as measured using the protocol referenced above.

In some instances, the carbonate coatings are highly reflective of ultraviolet (UV) light, ranging in some instances from 10 to 99%, such as 50 to 99%. By UV light is meant light having a wavelength ranging from 400 nm and 10 nm. UV reflectance may be determined using any convenient protocol, such as ASTM G173 referenced above. In some instances, the materials exhibit a UV value ranging from Rg; 0=0.0 to Rg; 0=1.0, such as Rg; 0=0.25 to Rg; 0=0.99, including Rg; 0=0.4 to Rg; 0=0.98, e.g., as measured using the protocol referenced above.

In some instances, the coatings are reflective of visible light, e.g., where reflectivity of visible light may vary, ranging in some instances from 10 to 99%, such as 10 to 90%. By visible light is meant light having a wavelength ranging from 380 nm to 740 nm. Visible light reflectance properties may be determined using any convenient protocol, such as ASTM G173 referenced above. In some instances, the coatings exhibit a visible light reflectance value ranging from Rg; 0=0.0 to Rg; 0=1.0, such as Rg;

O=0.25 to Rg; O=0.99, including Rg; O=0.4 to Rg; O=0.98, e.g., as measured using the protocol referenced above.

The materials making up the carbonate components are, in some instances, amorphous or microcrystalline. Where the materials are microcrystalline, the crystal size, e.g., as determined using the Scherrer equation applied to the FWHM of X-ray diffraction pattern, is small, and in some instances is 1,000 microns (μm) or less in diameter, such as 100 microns or less in diameter, and including 10 microns or less in diameter. In some instances, the crystal size ranges in diameter from 1,000 μm to 0.001 μm, such as 10 to 0.001 μm, including 1 to 0.001 μm. In some instances, the crystal size is chosen in view of the wavelength(s) of light that are to be reflected. For example, where light in the visible spectrum is to be reflected, the crystal size range of the materials may be selected to be less than one-half the "to be reflected" range, so as to give rise to photonic band gap. For example, where the to be reflected wavelength range of light is 100 to 1,000 nm, the crystal size of the material may be selected to be 50 nm or less, such as ranging from 1 to 50 nm, e.g., 5 to 25 nm. In some embodiments, the materials produced by methods of the invention may include rod-shaped crystals and amorphous solids. The rod-shaped crystals may vary in structure, and in certain embodiments have length to diameter ratio ranging from 500 to 1, such as 10 to 1. In certain embodiments, the length of the crystals ranges from 0.5 μm to 500 μm, such as from 5 μm to 100 μm. In yet other embodiments, substantially completely amorphous solids are produced.

The density, porosity, and permeability of the coating materials may vary according to the application. With respect to density, while the density of the material may vary, in some instances the density ranges from 5 g/cm$^3$ to 0.01 g/cm$^3$, such as 3 g/cm$^3$ to 0.3 g/cm$^3$ and including 2.7 g/cm$^3$ to 0.4 g/cm$^3$. With respect to porosity, as determined by Gas Surface Adsorption as determined by the BET method (Brown Emmett Teller (e.g., as described in S. Brunauer, P. H. Emmett and E. Teller, J. Am. Chem. Soc., 1938, 60, 309. doi:10.1021/ja01269a023) the porosity may range in some instances from 100 m$^2$/g to 0.1 m$^2$/g, such as 60 m$^2$/g to 1 m$^2$/g and including 40 m$^2$/g to 1.5 m$^2$/g. With respect to permeability, in some instances the permeability of the material may range from 0.1 to 100 darcies, such as 1 to 10 darcies, including 1 to 5 darcies (e.g., as determined using the protocol described in H. Darcy, Les Fontaines Publiques de la Ville de Dijon, Dalmont, Paris (1856)). Permeability may also be characterized by evaluating water absorption of the material. As determined by water absorption protocol, e.g., the water absorption of the material ranges, in some embodiments, from 0 to 25%, such as 1 to 15% and including from 2 to 9%.

The hardness of the materials may also vary. In some instances, the materials exhibit a Mohs hardness of 3 or greater, such as 5 or greater, including 6 or greater, where the hardness ranges in some instances from 3 to 8, such as 4 to 7 and including 5 to 6 Mohs (e.g., as determined using the protocol described in American Federation of Mineralogical Societies. "Mohs Scale of Mineral Hardness"). Hardness may also be represented in terms of tensile strength, e.g., as determined using the protocol described in ASTM C1167. In some such instances, the material may exhibit a compressive strength of 100 to 3,000 N, such as 400 to 2,000 N, including 500 to 1,800 N.

In some embodiments, the carbonate material includes one or more contaminants predicted not to leach into the environment by one or more tests selected from the group consisting of Toxicity Characteristic Leaching Procedure (TCLP), Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. Tests and combinations of tests may be chosen depending upon likely contaminants and storage conditions of the composition. For example, in some embodiments, the composition may include As, Cd, Cr, Hg, and Pb (or products thereof), each of which might be found in a waste gas stream of a $CO_2$ emitter, such as in the flue gas of a coal-fired power plant. Since TCLP tests for As, Ba, Cd, Cr, Pb, Hg, Se, and Ag, TCLP may be an appropriate test for aggregates described herein. In some embodiments, a carbonate composition of the invention includes As, wherein the composition is predicted not to leach As into the environment. For example, a TCLP extract of the composition may provide less than 5.0 mg/L As indicating that the composition is not hazardous with respect to As. In some embodiments, a carbonate composition of the invention includes Cd, wherein the composition is predicted not to leach Cd into the environment. For example, a TCLP extract of the composition may provide less than 1.0 mg/L Cd indicating that the composition is not hazardous with respect to Cd. In some embodiments, a carbonate composition of the invention includes Cr, wherein the composition is predicted not to leach Cr into the environment. For example, a TCLP extract of the composition may provide less than 5.0 mg/L Cr indicating that the composition is not hazardous with respect to Cr. In some embodiments, a carbonate composition of the invention includes Hg, wherein the composition is predicted not to leach Hg into the environment. For example, a TCLP extract of the composition may provide less than 0.2 mg/L Hg indicating that the composition is not hazardous with respect to Hg. In some embodiments, a carbonate composition of the invention includes Pb, wherein the composition is predicted not to leach Pb into the environment. For example, a TCLP extract of the composition may provide less than 5.0 mg/L Pb indicating that the composition is not hazardous with respect to Pb. In some embodiments, a carbonate composition and aggregate that includes of the same of the invention may be non-hazardous with respect to a combination of different contaminants in a given test. For example, the carbonate composition may be non-hazardous with respect to all metal contaminants in a given test. A TCLP extract of a composition, for instance, may be less than 5.0 mg/L in As, 100.0 mg/L in Ba, 1.0 mg/L in Cd, 5.0 mg/mL in Cr, 5.0 mg/L in Pb, 0.2 mg/L in Hg, 1.0 mg/L in Se, and 5.0 mg/L in Ag. Indeed, a majority if not all of the metals tested in a TCLP analysis on a composition of the invention may be below detection limits. In some embodiments, a carbonate composition of the invention may be non-hazardous with respect to all (e.g., inorganic, organic, etc.) contaminants in a given test. In some embodiments, a carbonate composition of the invention may be non-hazardous with respect to all contaminants in any combination of tests selected from the group consisting of Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. As such, carbonate compositions and aggregates including the same of the invention may effectively sequester $CO_2$ (e.g., as carbonates, bicarbonates, or a combinations thereof) along with various chemical species (or co-products thereof) from waste gas streams, industrial waste sources of divalent cations, industrial waste sources of proton-removing agents, or combinations thereof that might be considered contaminants if released into the environment. Compositions of the invention incorporate environmental contaminants (e.g., metals and co-products of metals such as Hg, Ag, As, Ba, Be, Cd, Co, Cr, Cu, Mn, Mo, Ni, Pb, Sb, Se, TI, V, Zn, or combinations thereof) in a non-leachable form.

The aggregate compositions of the invention include particles having a core region and a $CO_2$ sequestering carbonate coating on at least a portion of a surface of the core. The coating may cover 10% or more, 20% or more, 30% or more, 40% or more, 50% or more, 60% or more, 70% or more, 80% or more, 90% or more, including 95% or more of the surface of the core. The thickness of the carbonate layer may vary, as desired. In some instances, the thickness may range from 0.1 µm to 10 mm, such as 1 µm to 1,000 µm, including 10 µm to 500 µm.

The core of the coated particles of the aggregate compositions described herein may vary widely. The core may be made up of any convenient aggregate material. Examples of suitable aggregate materials include, but are not limited to: natural mineral aggregate materials, e.g., carbonate rocks, sand (e.g., natural silica sand), sandstone, gravel, granite, diorite, gabbro, basalt, etc.; and synthetic aggregate materials, such as industrial byproduct aggregate materials, e.g., blast furnace slag, fly ash, municipal waste, and recycled concrete, etc. In some instances, the core comprises a material that is different from the carbonate coating such as a pellet made from any of the superfine materials referenced above.

In some embodiments, the method of producing carbonate aggregates comprises the methods detailed in U.S. Provisional Application Ser. No. 62/795,986 filed on Jan. 23, 2019; the disclosure of which applications is herein incorporated by reference and includes methods whereby the carbonate aggregates are produced optionally without a seed structure, e.g., pure carbonate aggregates.

In some instances, the aggregates are lightweight aggregates. In such instances, the core of the coated particles of the aggregate compositions described herein may vary widely, so long as when it is coated it provides for the desired lightweight aggregate composition. The core may be made up of any convenient material. Examples of suitable aggregate materials include, but are not limited to: conventional lightweight aggregate materials, e.g., naturally occurring lightweight aggregate materials, such as crushed volcanic rocks, e.g., pumice, scoria or tuff, and synthetic materials, such as thermally treated clays, shale, slate, diatomite, perlite, vermiculite, blast furnace slag, basic oxygen furnace slag, electric arc furnace slag and fly ash; as well as unconventional porous materials, e.g., crushed corals, synthetic materials like polymers and low density polymeric materials, recycled wastes such as wood, fibrous materials, cement kiln dust residual materials, demolished/recycled/returned concrete materials, recycled glass, various volcanic minerals, granite, silica bearing minerals, mine tailings and the like.

The physical properties of the coated particles of the aggregate compositions may vary. Aggregates of the invention have a density that may vary so long as the aggregate provides the desired properties for the use for which it will be employed, e.g., for the building material in which it is employed. In certain instances, the density of the aggregate particles ranges from 1.1 to 5 g/cm$^3$, such as 1.3 g/cm$^3$ to 3.15 g/cm$^3$, and including 1.8 g/cm$^3$ to 2.7 g/cm$^3$. Other particle densities in embodiments of the invention, e.g., for lightweight aggregates, may range from 1.1 to 2.2 g/cm$^3$, e.g., 1.2 to 2.0 g/cm$^3$ or 1.4 to 1.8 g/cm$^3$. In some embodiments the invention provides aggregates that range in bulk density (unit weight) from 35 lb/ft$^3$ to 200 lb/ft$^3$, or 50 lb/ft$^3$ to 200 lb/ft$^3$, or 75 lb/ft$^3$ to 175 lb/ft$^3$, or 50 lb/ft$^3$ to 100 lb/ft$^3$, or 75 lb/ft$^3$ to 125 lb/ft$^3$, or 85 lb/ft$^3$ to 115 lb/ft$^3$, or 100 lb/ft$^3$ to 200 lb/ft$^3$, or 125 lb/ft$^3$ to 150 lb/ft$^3$, or 140 lb/ft$^3$ to 160 lb/ft$^3$, or 50 lb/ft$^3$ to 200 lb/ft$^3$, or 35 lb/ft$^3$ to 200 lb/ft$^3$. Some embodiments of the invention provide lightweight aggregate, e.g., aggregate that has a bulk density (unit weight) of 75 lb/ft$^3$ to 125 lb/ft$^3$, such as 90 lb/ft$^3$ to 115 lb/ft$^3$. In some instances, the lightweight aggregates have a weight ranging from 50 to 1,200 kg/m$^3$, such as 80 to 11 kg/m$^3$.

The hardness of the aggregate particles making up the aggregate compositions of the invention may also vary, and in certain instances the hardness, expressed on the Mohs scale, ranges from 1.0 to 9, such as 1 to 7, including 1 to 6 or 1 to 5. In some embodiments, the Mohs hardness of aggregates of the invention ranges from 2-5, or 2-4. In some embodiments, the Mohs hardness ranges from 2-6. Other hardness scales may also be used to characterize the aggregate, such as the Rockwell, Vickers, or Brinell scales, and equivalent values to those of the Mohs scale may be used to characterize the aggregates of the invention; e.g., a Vickers hardness rating of 250 corresponds to a Mohs rating of 3; conversions between the scales are known in the art.

The abrasion resistance of an aggregate may also be important, e.g., for use in a roadway surface, where aggregates of high abrasion resistance are useful to keep surfaces from polishing. Abrasion resistance is related to hardness but is not the same. Aggregates of the invention include aggregates that have an abrasion resistance similar to that of natural limestone, or aggregates that have an abrasion resistance superior to natural limestone, as well as aggregates having an abrasion resistance lower than natural limestone, as measured by art accepted methods, such as ASTM C131. In some embodiments aggregates of the invention have an abrasion resistance of less than 50%, or less than 40%, or less than 35%, or less than 30%, or less than 25%, or less than 20%, or less than 15%, or less than 10%, when measured by ASTM C131 referenced above.

Aggregates of the invention may also have a porosity within particular ranges. As will be appreciated by those of skill in the art, in some cases a highly porous aggregate is desired, in others an aggregate of moderate porosity is desired, while in other cases aggregates of low porosity, or no porosity, are desired. Porosities of aggregates of some embodiments of the invention, as measured by water uptake after oven drying followed by full immersion for 60 minutes, expressed as % dry weight, can be in the range of 1 to 40%, such as 2 to 20%, or 2 to 15%, including 2 to 10% or even 3 to 9%.

The dimensions of the aggregate particles may vary. Aggregate compositions of the invention are particulate compositions that may in some embodiments be classified as fine or coarse. Fine aggregates according to embodiments of the invention are particulate compositions that almost entirely pass through a No. 4 sieve (ASTM C125 and ASTM C33). Fine aggregate compositions according to embodiments of the invention have an average particle size ranging from 10 µm to 4.75 mm, such as 50 µm to 3.0 mm and including 75 µm to 2.0 mm. Coarse aggregates of the invention are compositions that are predominantly retained on a No. 4 sieve (ASTM C125 and ASTM C33). Coarse aggregate compositions according to embodiments of the invention are compositions that have an average particle size ranging from 4.75 mm to 200 mm, such as 4.75 to 150 mm in and including 5 to 100 mm. As used herein, "aggregate"

may also in some embodiments encompass larger sizes, such as 3 inches (in.) to 12 in. or even 3 in. to 24 in., or larger, such as 12 in. to 48 in., or larger than 48 in.

In some instances, aggregates as described herein find use as aggregates of internal curing concretes, where the aggregates allow for the release of water over time to fully and evenly hydrate the cementitious components of the concrete. Internal curing aggregate products of such embodiments may be used to improve performance of concrete by increasing autogenous curing and reducing chemical shrinkage, leading to reduced cracking of the concrete body through the slow and uniform release of water throughout the placed concrete. Aspects of these embodiments include the use of internal curing aggregate products as described above to increase the performance of concrete, its various forms and types. As described above, the internal curing aggregate products are composed of, either partially or wholly, sequestered anthropogenic carbon from point source $CO_2$ emitters, such as DAC systems and power plants, refineries and cement plants. The carbon, coming from carbon dioxide gas, is sequestered by methods of carbon capture and mineralization such as those in: U.S. application Ser. No. 14/204,994 published as US-2014-0322803-A1; 14/214,129 published as US 2014-0271440 A1; and Ser. No. 14/861,996 published as US 2016-0082387 A1; as well as U.S. Pat. Nos. 9,707,513; 9,714,406 and 9,993,799; the disclosures of which are herein incorporated by reference. The captured $CO_2$ results in synthetic limestone in the form of calcium or other divalent cationic carbonate solids composing part or all of the internal curing aggregate products for concrete. Aspects of the invention include use of a rock composed wholly or partially of aggregate for use in concrete, mortar, pavements or other building materials that contain $CO_2$ stemming from DAC systems or the combustion of fossil fuels or other forms of fuels and other $CO_2$ criteria pollutant sources. In some embodiments, aggregates, either fine or coarse, manufactured from methods of carbon capture and mineralization as described above are employed as internal curing aggregates for concrete and meat ASTM Standard Specification for Lightweight Aggregate for Internal Curing of Concrete C1761, which provides guidelines to estimate the amount of lightweight aggregate required for internal curing per unit volume of concrete. Further details regarding the use of aggregates in internal curing concrete applications are provided in U.S. Provisional Application Ser. No. 62/624,022 filed Jan. 30, 2018, the disclosure of which is herein incorporated by reference.

Concrete Dry Composites

Also provided are concrete dry composites that, upon combination with a suitable setting liquid (such as described below), produce a settable composition that sets and hardens into a concrete or a mortar. Concrete dry composites as described herein include an amount of an aggregate, e.g., as described above, and a cement, such as a hydraulic cement. The term "hydraulic cement" is employed in its conventional sense to refer to a composition which sets and hardens after combining with water or a solution where the solvent is water, e.g., an admixture solution. Setting and hardening of the product produced by combination of the concrete dry composites of the invention with an aqueous liquid results from the production of hydrates that are formed from the cement upon reaction with water, where the hydrates are essentially insoluble in water.

Aggregates of the invention find use in place of conventional natural rock aggregates used in conventional concrete when combined with pure Portland cement. Other hydraulic cements of interest in certain embodiments are Portland cement blends. The phrase "Portland cement blend" includes a hydraulic cement composition that includes a Portland cement component and significant amount of a non-Portland cement component. As the cements of the invention are Portland cement blends, the cements include a Portland cement component. The Portland cement component may be any convenient Portland cement. As is known in the art, Portland cements are powder compositions produced by grinding Portland cement clinker (more than 90%), a limited amount of calcium sulfate which controls the set time, and up to 5% minor constituents (as allowed by various standards). When the exhaust gases used to provide carbon dioxide for the reaction contain SOx, then sufficient sulphate may be present as calcium sulfate in the precipitated material, either as a cement or aggregate to offset the need for additional calcium sulfate. As defined by the European Standard EN197.1, "Portland cement clinker is a hydraulic material which shall consist of at least two-thirds by mass of calcium silicates ($3CaO \cdot SiO_2$ and $2CaO \cdot SiO_2$), the remainder consisting of aluminium- and iron-containing clinker phases and other compounds. The ratio of CaO to $SiO_2$ shall not be less than 2.0. The magnesium content (MgO) shall not exceed 5.0% by mass." The concern about MgO is that later in the setting reaction, magnesium hydroxide ($Mg(OH)_2$), brucite, may form, leading to the deformation and weakening and cracking of the cement. In the case of magnesium carbonate containing cements, brucite will not form as it may with MgO. In certain embodiments, the Portland cement constituent of the present invention is any Portland cement that satisfies ASTM C150 Standard Specification of Portland Cement. ASTM C150 covers eight types of Portland cement, Types I-VIII, each possessing different properties, and used specifically for those properties.

Also of interest as hydraulic cements are carbonate containing hydraulic cements. Such carbonate containing hydraulic cements, methods for their manufacture and use are described in U.S. Pat. No. 7,735,274; the disclosure of which applications are herein incorporated by reference.

In certain embodiments, the hydraulic cement may be a blend of two or more different kinds of hydraulic cements, such as Portland cement and a carbonate containing hydraulic cement. In certain embodiments, the amount of a first cement, e.g., Portland cement in the blend ranges from 10 to 90% (w/w), such as 30 to 70% (w/w) and including 40 to 60% (w/w), e.g., a blend of 80% OPC and 20% carbonate hydraulic cement.

In some instances, the concrete dry composite compositions, as well as concretes produced therefrom, have a CARBONSTAR® Rating (CSR) that is less than the CSR of the control composition that does not include an aggregate of the invention. The CSR is a value that characterizes the embodied carbon (in the form of $CaCO_3$ or other $X_mCO_3$) for any product, in comparison to how carbon intensive production of the product itself is (i.e., in terms of the production $CO_2$). The CSR is a metric based on the embodied mass of or offset quantity of $CO_2$ in a unit of concrete. Of the three components in concrete—water, cement and aggregate—cement is by far the most significant contributor to $CO_2$ emissions, roughly 1:1 by mass (1 ton cement produces roughly 1 ton $CO_2$). So, if a cubic yard of concrete uses 600 lb cement, then its CSR is 600. A cubic yard of concrete according to embodiments of the present invention which include 600 lb cement and in which at least a portion of the aggregate is carbonate coated aggregate, e.g., as described above, will have a CSR that is less than 600, e.g., where the CSR may be 550 or less, such as 500 or less, including 400 or less, e.g., 250 or less, such as 100 or less, where in some instances the CSR may be a negative value, e.g., −100 or less, such as −500 or less including −1,000 or less, where in some instances the CSR of a cubic yard of concrete having 600 lbs cement may range from 500 to −5,000, such as −100 to −4,000, including −500 to −3,000. To determine the CSR of a given cubic yard of concrete that includes carbonate coated aggregate of the invention, an initial value of $CO_2$ generated for the production of the cement component of the concrete cubic yard is determined. For example, where the yard includes 600 lbs of cement, the initial value of 600 is assigned to the yard. Next, the amount of carbonate coating in the yard is determined. Since the molecular weight of carbonate is 100 a.u., and 44% of carbonate is $CO_2$, the amount of carbonate coating is present in the yard is then multiplied by 44% (0.44) and the resultant value subtracted from the initial value in order to obtain the CSR for the yard. For example, where a given yard of concrete mix is made up of 600 lb of cement, 300 lb of water, 1,429 lb of fine aggregate and 1,739 lb of coarse aggregate, the weight of a yard of concrete is 4,068 lb and the CSR is 600. If 10% of the total mass of aggregate in this mix is replaced by aggregate with a carbonate coating, e.g., as described above, the amount of carbonate present in the revised yard of concrete is 317 lbs. Multiplying this value by 44% yields 139. Subtracting this number from 600 provides a CSR of 461.

Settable Compositions

Settable compositions of the invention, such as concretes and mortars, are produced by combining a hydraulic cement with an amount of aggregate (fine for mortar, e.g., sand; coarse with or without fine for concrete) and an aqueous liquid, e.g., water, either at the same time or by pre-combining the cement with aggregate, and then combining the resultant dry components with water. The choice of coarse aggregate material for concrete mixes using cement compositions of the invention may have a minimum size of about ⅜ inch and can vary in size from that minimum up to one inch or larger, including in gradations between these limits. Finely divided aggregate is smaller than ⅜ inch in size and again may be graduated in much finer sizes down to 200-sieve size or so. Fine aggregates may be present in both mortars and concretes of the invention. The weight ratio of cement to aggregate in the dry components of the cement may vary, and in certain embodiments ranges from 1:10 to 4:10, such as 2:10 to 5:10 and including from 55:100 to 70:100.

The liquid phase, e.g., aqueous fluid, with which the dry component is combined to produce the settable composition, e.g., concrete, may vary, from pure water to water that includes one or more solutes, additives, co-solvents, etc., as desired. The ratio of dry component to liquid phase that is combined in preparing the settable composition may vary, and in certain embodiments ranges from 2:10 to 7:10, such as 3:10 to 6:10 and including 4:10 to 6:10.

In certain embodiments, the cements may be employed with one or more admixtures. Admixtures are compositions added to concrete to provide it with desirable characteristics that are not obtainable with basic concrete mixtures or to modify properties of the concrete to make it more readily useable or more suitable for a particular purpose or for cost reduction. As is known in the art, an admixture is any material or composition, other than the hydraulic cement, aggregate and water, that is used as a component of the concrete or mortar to enhance some characteristic, or lower the cost, thereof. The amount of admixture that is employed may vary depending on the nature of the admixture. In certain embodiments the amounts of these components range from 0.1 to 50% w/w, such as 2 to 10% w/w.

Admixtures of interest include finely divided mineral admixtures such as cementitious materials; pozzolans; pozzolanic and cementitious materials; and nominally inert materials. Pozzolans include diatomaceous earth, opaline cherts, clays, shales, fly ash, silica fume, volcanic tuffs and pumicites are some of the known pozzolans. Certain ground granulated iron and steel slags and high calcium fly ashes possess both pozzolanic and cementitious properties. Nominally inert materials can also include finely divided raw quartz, dolomites, limestone, marble, granite, and others. Fly ash is defined in ASTM C618.

Other types of admixture of interest include plasticizers, accelerators, retarders, air-entrainers, foaming agents, water reducers, corrosion inhibitors, and pigments.

As such, admixtures of interest include, but are not limited to: set accelerators, set retarders, air-entraining agents, defoamers, alkali-reactivity reducers, bonding admixtures, dispersants, coloring admixtures, corrosion inhibitors, dampproofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. Admixtures are well-known in the art and any suitable admixture of the above type or any other desired type may be used; see, e.g., U.S. Pat. No. 7,735,274, incorporated herein by reference in its entirety.

In some instances, the settable composition is produced using an amount of a bicarbonate-rich product (BRP) admixture, which may be liquid or solid form, e.g., as described in U.S. Pat. No. 9,714,406; the disclosure of which is herein incorporated by reference.

In certain embodiments, settable compositions of the invention include a cement employed with fibers, e.g., where one desires fiber-reinforced concrete. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

The components of the settable composition can be combined using any convenient protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

Following the combination of the components to produce a settable composition (e.g., concrete), the settable compositions are in some instances initially flowable compositions, and then set after a given period of time. The setting time may vary, and in certain embodiments ranges from 30 minutes to 48 hours, such as 30 minutes to 24 hours and including from 1 hour to 4 hours.

The strength of the set product may also vary. In certain embodiments, the strength of the set cement may range from 5 Mpa to 70 MPa, such as 10 MPa to 50 MPa and including from 20 MPa to 40 MPa. In certain embodiments, set products produced from cements of the invention are extremely durable. e.g., as determined using the test method described in ASTM C1157.

Structures

Aspects of the invention further include structures produced from the aggregates and settable compositions of the invention. As such, further embodiments include manmade structures that contain the aggregates of the invention and methods of their manufacture. Thus in some embodiments the invention provides a manmade structure that includes one or more aggregates as described herein. The manmade structure may be any structure in which an aggregate may be used, such as a building, dam, levee, roadway or any other manmade structure that incorporates an aggregate or rock. In some embodiments, the invention provides a manmade structure, e.g., a building, a dam, or a roadway, that includes an aggregate of the invention, where in some instances the aggregate may contain $CO_2$ from a fossil fuel source, e.g., as described above. In some embodiments the invention provides a method of manufacturing a structure, comprising providing an aggregate of the invention.

Albedo Enhancing Applications

In some instances, the solid carbonate product may be employed in albedo enhancing applications. Albedo, i.e., reflection coefficient, refers to the diffuse reflectivity or reflecting power of a surface. It is defined as the ratio of reflected radiation from the surface to incident radiation upon it. Albedo is a dimensionless fraction, and may be expressed as a ratio or a percentage. Albedo is measured on a scale from zero for no reflecting power of a perfectly black surface, to 1 for perfect reflection of a white surface. While albedo depends on the frequency of the radiation, as used herein Albedo is given without reference to a particular wavelength and thus refers to an average across the spectrum of visible light, i.e., from about 380 to about 740 nm.

As the methods of these embodiments are methods of enhancing albedo of a surface, the methods in some instances result in a magnitude of increase in albedo (as compared to a suitable control, e.g., the albedo of the same surface not subjected to methods of invention) that is 0.05 or greater, such as 0.1 or greater, e.g., 0.2 or greater, 0.3 or greater, 0.4 or greater, 0.5 or greater, 0.6 or greater, 0.7 or greater, 0.8 or greater, 0.9 or greater, including 0.95 or greater, including up to 1.0. As such, aspects of the subject methods include increasing albedo of a surface to 0.1 or greater, such as 0.2 or greater, e.g., 0.3 or greater, 0.4 or greater, 0.5 or greater, 0.6 or greater, 0.7 or greater, 0.8 or greater, 0.9 or greater, 0.95 or greater, including 0.975 or greater and up to approximately 1.0.

Aspects of the methods include associating with a surface of interest an amount of a highly reflective microcrystalline or amorphous material composition, e.g., as described above, effective to enhance the albedo of the surface by a desired amount, such as the amounts listed above. The material composition may be associated with the target surface using any convenient protocol. As such, the material composition may be associated with the target surface by incorporating the material into the material of the object having the surface to be modified. For example, where the target surface is the surface of a building material, such as a roof tile or concrete mixture, the material composition may be included in the composition of the material so as to be present on the target surface of the object. Alternatively, the material composition may be positioned on at least a portion of the target surface, e.g., by coating the target surface with the composition. Where the surface is coated with the material composition, the thickness of the resultant coating on the surface may vary, and in some instances may range from 0.1 mm to 25 mm, such as 2 mm to 20 mm and including 5 mm to 10 mm. Applications in use as highly reflective pigments in paints and other coatings like photovoltaic solar panels are also of interest.

The albedo of a variety of surfaces may be enhanced. Surfaces of interest include at least partially facing skyward surfaces of both man-made and naturally occurring objects. Man-made surfaces of interest include, but are not limited to: roads, sidewalks, buildings and components thereof, e.g., roofs and components thereof (roof shingles, roofing granules, etc.) and sides, runways, and other man-made structures, e.g., walls, dams, monuments, decorative objects, etc. Naturally occurring surfaces of interest include, but are not limited to: plant surfaces, e.g., as found in both forested and non-forested areas, non-vegetated locations, water, e.g., lake, ocean and sea surfaces, etc.

For example, the albedo of colored granules may be readily increased using methods as described herein to produce a carbonate layer on the surface of the colored roofing granules. While the thickness of the layer of carbonate material present on the surface of the colored roofing granules may vary, in some instances the thickness ranges from 0.1 to 200 μm, such as 1 to 150 μm, including 5 to 100 μm. A variety of different types of colored granules may be coated as described above, e.g., to enhance their reflectivity without substantially diminishing their color, if at all. Examples of types of granules that may be coated with a carbonate layer as described herein include roofing granules.

Roofing granules that may be coated with a carbonate layer, e.g., to improve their reflectivity without substantially reducing their color, if at all, may include a core formed by crushed and screened mineral materials, which are subsequently coated with one or more color coating layers comprising a binder in which is dispersed one or more coloring pigments, such as suitable metal oxides. Inorganic binders may be employed. The binder can be a soluble alkaline silicate that is subsequently insolubilized by heat or by chemical reaction, such as by reaction between an acidic material and the alkaline silicate, resulting in an insoluble colored coating on the mineral particles. The base particles employed in the process of preparing the roofing granules of the present invention can take several forms. The base particles may be inert core particles. The core particles may be chemically inert materials, such as inert mineral particles, solid or hollow glass or ceramic spheres, or foamed glass or ceramic particles. Suitable mineral particles can be produced by a series of quarrying, crushing, and screening operations, are generally intermediate between sand and gravel in size (that is, between about No. 8 and about No. 70 mesh). The core particles have an average particle size of from about 0.2 mm to about 3 mm, e.g., from about 0.4 mm to about 2.4 mm. In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as manufactured materials such as ceramic grog and proppants, and recycled manufactured materials such as crushed bricks, concrete, porcelain, fire clay, and the like. Solid and hollow glass spheres are available, for example, from Potters Industries Inc., P.O. Box 840, Valley Forge, Pa. 19482-0840, such as SPHERIGLASS® solid "A" glass spheres product grade 1922 having a mean size of 0.203 mm, product code 602578 having a mean size of 0.59 mm, BALLOTTINI impact beads product grade A with a size range of 600 to 850 micrometers (Nos. 20 to 30 mesh), and QCEL hollow spheres, product code 300 with a mean particle size of 0.090 mm. Glass spheres can be coated or treated with a suitable coupling agent if desired for better adhesion to the binder of the inner coating composition. In the granules, the particles can be coated with a coating composition that includes binder and a pigment. The coating binder can be an inorganic material, such as a metal-silicate binder, for example an alkali metal silicate, such as sodium silicate.

The coatings pigments that may be used include, but are not limited to PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

Methods as described herein may also be employed to produce frac sands. Frac sands are used in the oil and gas recovery industry to maintain porous void space in fractured geologic structure, so as to maintain geologic fracture integrity. Methods described herein may be employed to produce coated substrates and manufactured sands with tailorable surface coatings that can contribute to the buoyancy of the sand when in fluid flow. Methods as described herein may be employed to produce substrate with a closely regular patterning or irregular patterning of carbonate materials (crystalline or amorphous) as to effectively design the surface of the sands to maintain an above average buoyancy in the flow of fracking fluid, while the fluids are being pumped under very high pressure into the geologic fracture site. In some instances, the methods produce a product with a crystalline or amorphous however unreacted cementitious coating compound, such that upon contact with a second medium, the material could react as an expansive cement, providing void space for gas and fluid flow from surrounding geologic structure. This expansive property could be activated by intimate fluid or gas contact, sustained fluid contact, or other magnetic or sound wave activation provided from the geologic surface.

Methods of using the carbonate precipitate compounds described herein in varying applications as described above, including albedo enhancing applications, as well as compositions produced thereby, are further described in U.S. Pat. No. 9,993,799 and in PCT published application No. WO/2014/144/848; the disclosures of which applications are herein incorporated by reference.

Ammonia Regeneration

As summarized above, production of $CO_2$ sequestering carbonate from the aqueous ammonia capture liquid and the gaseous source of $CO_2$ yields an aqueous ammonium salt. The produced aqueous ammonium salt may vary with respect to the nature of the anion of the ammonium salt, where specific ammonium salts that may be present in the aqueous ammonium salt include, but are not limited to, ammonium chloride, ammonium acetate, ammonium sulfate, ammonium nitrate, etc.

As reviewed above, aspects of the invention further include regenerating an aqueous capture ammonia, e.g., as described above, from the aqueous ammonium salt. By regenerating an aqueous capture ammonium is meant processing the aqueous ammonium salt in a manner sufficient to generate an amount of ammonium from the aqueous ammonium salt. The percentage of input ammonium salt that is converted to ammonia during this regeneration step may vary, ranging in some instances from 20 to 80%, such as 35 to 55%.

Ammonia may be regenerated from an aqueous ammonium salt in this regeneration step using any convenient regeneration protocol. In some instances, a distillation protocol is employed. While any convenient distillation protocol may be employed, in some embodiments the employed distillation protocol includes heating the aqueous ammonium salt in the presence of an alkalinity source, e.g., geomass, to produce a gaseous ammonia/water product, which may then be condensed to produce a liquid aqueous capture ammonia. In some instances, the protocol happens continuously in a stepwise process wherein heating the aqueous ammonium salt in the present of an alkalinity source happens before the distillation and condensation of liquid aqueous capture ammonia.

The alkalinity source may vary, so long as it is sufficient to convert ammonium in the aqueous ammonium salt to ammonia. Any convenient alkalinity source may be employed.

Alkalinity sources that may be employed in this regeneration step include chemical agents. Chemical agents that may be employed as alkalinity sources include, but are not limited to, hydroxides, organic bases, super bases, oxides, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. Super bases suitable for use as proton-removing agents include sodium ethoxide, sodium amide ($NaNH_2$), sodium hydride (NaH), butyl lithium, lithium diisopropylamide, lithium diethylamide, and lithium bis (trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used.

Also of interest as alkalinity sources are silica sources. The source of silica may be pure silica or a composition that includes silica in combination with other compounds, e.g., minerals, so long as the source of silica is sufficient to impart desired alkalinity. In some instances, the source of silica is a naturally occurring source of silica. Naturally occurring sources of silica include silica containing rocks, which may be in the form of sands or larger rocks. Where the source is larger rocks, in some instances the rocks have been broken down to reduce their size and increase their surface area. Of interest are silica sources made up of components having a longest dimension ranging from 0.01 mm to 1 meter, such as 0.1 mm to 500 cm, including 1 mm to 100 cm, e.g., 1 mm to 50 cm. The silica sources may be surface treated, where desired, to increase the surface area of the sources. A variety of different naturally occurring silica sources may be employed. Naturally occurring silica sources of interest include, but are not limited to, igneous rocks, which rocks include: ultramafic rocks, such as Komatiite, Picrite basalt, Kimberlite, Lamproite, Peridotite; mafic rocks, such as Basalt, Diabase (Dolerite) and Gabbro; intermediate rocks, such as Andesite and Diorite; intermediate felsic rocks, such as Dacite and Granodiorite; and Felsic rocks, such as Rhyolite, Aplite-Pegmatite and Granite. Also of interest are man-made sources of silica. Man-made sources of silica include, but are not limited to, waste streams such as: mining wastes; fossil fuel burning ash; slag, e.g. iron and steel slags, phosphorous slag; cement kiln waste; oil refinery/petrochemical refinery waste, e.g. oil field and methane seam brines; coal seam wastes, e.g. gas production brines and coal seam brine; paper processing waste; water softening, e.g. ion exchange waste brine; silicon processing wastes; agricultural waste; metal finishing waste; high pH textile waste; and caustic sludge. Mining wastes include any wastes from the extraction of metal or another precious or useful mineral from the earth. Wastes of interest include wastes from mining to be used to raise pH, including: red mud from the Bayer aluminum extraction process; the waste from magnesium extraction for sea water, e.g. at Moss Landing, Calif.; and the wastes from other mining processes involving leaching. Ash from processes burning fossil fuels, such as coal fired power plants, create ash that is often rich in silica. In some embodiments, ashes resulting from burning fossil fuels, e.g. coal fired power plants, are provided as silica sources, including fly ash, e.g., ash that exits out the smoke stack, and bottom ash. Additional details regarding silica sources and their use are described in U.S. Pat. No. 9,714,406; the disclosure of which is herein incorporated by reference.

In embodiments of the invention, ash is employed as an alkalinity source. Of interest in certain embodiments is use of a coal ash as the ash. The coal ash as employed in this invention refers to the residue produced in power plant boilers or coal burning furnaces, for example, chain grate boilers, cyclone boilers and fluidized bed boilers, from burning pulverized anthracite, lignite, bituminous or sub-bituminous coal. Such coal ash includes fly ash which is the finely divided coal ash carried from the furnace by exhaust or flue gases; and bottom ash which collects at the base of the furnace as agglomerates.

Fly ashes are generally highly heterogeneous, and include of a mixture of glassy particles with various identifiable crystalline phases such as quartz, mullite, and various iron oxides. Fly ashes of interest include Type F and Type C fly ash. The Type F and Type C fly ashes referred to above are defined by CSA Standard A23.5 and ASTM C618 as mentioned above. The chief difference between these classes is the amount of calcium, silica, alumina, and iron content in the ash. The chemical properties of the fly ash are largely influenced by the chemical content of the coal burned (i.e., anthracite, bituminous, and lignite). Fly ashes of interest include substantial amounts of silica (silicon dioxide, $SiO_2$) (both amorphous and crystalline) and lime (calcium oxide, CaO, magnesium oxide, MgO).

The burning of harder, older anthracite and bituminous coal typically produces Class F fly ash. Class F fly ash is pozzolanic in nature, and contains less than 10% lime (CaO). Fly ash produced from the burning of younger lignite or subbituminous coal, in addition to having pozzolanic properties, also has some self-cementing properties. In the presence of water, Class C fly ash will harden and gain strength over time. Class C fly ash generally contains more than 20% lime (CaO). Alkali and sulfate ($SO_4^{2-}$) contents are generally higher in Class C fly ashes. In some embodiments it is of interest to use Class C fly ash to regenerate ammonia from an aqueous ammonium salt, e.g., as mentioned above, with the intention of extracting quantities of constituents present in Class C fly ash so as to generate a fly ash closer in characteristics to Class F fly ash, e.g., extracting 95% of the CaO in Class C fly ash that has 20% CaO, thus resulting in a remediated fly ash material that has 1% CaO.

Fly ash material solidifies while suspended in exhaust gases and is collected using various approaches, e.g., by electrostatic precipitators or filter bags. Since the particles solidify while suspended in the exhaust gases, fly ash particles are generally spherical in shape and range in size from 0.5 μm to 100 μm. Fly ashes of interest include those in which at least about 80%, by weight comprises particles of less than 45 microns. Also of interest in certain embodiments of the invention is the use of highly alkaline fluidized bed combustor (FBC) fly ash.

Also of interest in embodiments of the invention is the use of bottom ash. Bottom ash is formed as agglomerates in coal combustion boilers from the combustion of coal.

Such combustion boilers may be wet bottom boilers or dry bottom boilers. When produced in a wet or dry bottom boiler, the bottom ash is quenched in water. The quenching results in agglomerates having a size in which 90% fall within the particle size range of 0.1 mm to 20 mm, where the bottom ash agglomerates have a wide distribution of agglomerate size within this range. The main chemical components of a bottom ash are silica and alumina with lesser amounts of oxides of Fe, Ca, Mg, Mn, Na and K, as well as sulphur and carbon.

Also of interest in certain embodiments is the use of volcanic ash as the ash. Volcanic ash is made up of small tephra, i.e., bits of pulverized rock and glass created by volcanic eruptions, less than 2 millimeters in diameter.

In one embodiment of the invention, cement kiln dust (CKD) is employed as an alkalinity source. The nature of the fuel from which the ash and/or CKD were produced, and the means of combustion of said fuel, will influence the chemical composition of the resultant ash and/or CKD. Thus ash and/or CKD may be used as a portion of the means for adjusting pH, or the sole means, and a variety of other components may be utilized with specific ashes and/or CKDs, based on chemical composition of the ash and/or CKD.

In certain embodiments of the invention, slag is employed as an alkalinity source. The slag may be used as a as the sole pH modifier or in conjunction with one or more additional pH modifiers, e.g., ashes, etc. Slag is generated from the processing of metals, and may contain calcium and magnesium oxides as well as iron, silicon and aluminum compounds. In certain embodiments, the use of slag as a pH modifying material provides additional benefits via the introduction of reactive silicon and alumina to the precipitated product. Slags of interest include, but are not limited to, blast furnace slag from iron smelting, slag from electric-arc or blast furnace processing of iron and/or steel, copper slag, nickel slag and phosphorus slag.

As indicated above, ash (or slag in certain embodiments) is employed in certain embodiments as the sole way to modify the pH of the water to the desired level. In yet other embodiments, one or more additional pH modifying protocols is employed in conjunction with the use of ash.

Also of interest in certain embodiments is the use of other waste materials, e.g., crushed or demolished or recycled or returned concretes or mortars, as an alkalinity source. When employed, the concrete dissolves releasing sand and aggregate which, where desired, may be recycled to the carbonate production portion of the process. Use of demolished and/or recycled concretes or mortars is further described below.

Of interest in certain embodiments are mineral alkalinity sources. The mineral alkalinity source that is contacted with the aqueous ammonium salt in such instances may vary, where mineral alkalinity sources of interest include, but are not limited to: silicates, carbonates, fly ashes, slags, limes, cement kiln dusts, etc., e.g., as described above. In some instances, the mineral alkalinity source comprises a rock, e.g., as described above.

In embodiments, the alkalinity source is a geomass, e.g., as described in greater detail below.

While the temperature to which the aqueous ammonium salt is heated in these embodiments may vary, in some instances the temperature ranges from 25 to 200° C., such as 25 to 185° C. The heat employed to provide the desired temperature may be obtained from any convenient source, including steam, a waste heat source, such as flue gas waste heat, etc.

Distillation may be carried out at any pressure. Where distillation is carried out at atmospheric pressure, the temperature at which distillation is carried out may vary, ranging in some instances from 50 to 120° C., such as 60 to 100° C., e.g., from 70 to 90° C. In some instances, distillation is carried out at a sub-atmospheric pressure. While the pressure in such embodiments may vary, in some instances the sub-atmospheric pressure ranges from 1 to 14 psig, such as from 2 to 6 psig. Where distillation is carried out at sub-atmospheric pressure, the distillation may be carried out at a reduced temperature as compared to embodiments that are performed at atmospheric pressure. While the temperature may vary in such instances as desired, in some embodiments where a sub-atmospheric pressure is employed, the temperature ranges from 15 to 60° C., such as 25 to 50° C. Of interest in sub-atmospheric pressure embodiments is the use of a waste heat for some, if not all, of the heat employed during distillation. Waste heat sources of that may be employed in such instances include, but are not limited to: flue gas, process steam condensate, heat of absorption generated by $CO_2$ capture and resultant ammonium carbonate production; and a cooling liquid (such as from a co-located source of $CO_2$ containing gas, such as a power plant, factory etc., e.g., as described above), and combinations thereof.

Aqueous capture ammonia regeneration may also be achieved using an electrolysis mediated protocol, in which a direct electric current is introduced into the aqueous ammonium salt to regenerate ammonia. Any convenient electrolysis protocol may be employed. Examples of electrolysis protocols that may be adapted for regeneration of ammonia from an aqueous ammonium salt may employed one or more elements from the electrolysis systems described in U.S. Pat. Nos. 7,727,374 and 8,227,127, as well as published PCT Application Publication No. WO/2008/018928; the disclosures of which are hereby incorporated by reference.

In some instances, the aqueous capture ammonia is regenerated from the aqueous ammonium salt without the input of energy, e.g., in the form of heat and/or electric current, such as described above. In such instances, the aqueous ammonium salt is combined with an alkaline source, such as a geomass source, e.g., as described above, in a manner sufficient to produce a regenerated aqueous capture ammonia. The resultant aqueous capture ammonia is then not purified, e.g., by input of energy, such as via stripping protocol, etc.

The resultant regenerated aqueous capture ammonia may vary, e.g., depending on the particular regeneration protocol that is employed. In some instances, the regenerated aqueous capture ammonia includes ammonia ($NH_3$) at a concentration ranging from 0.1 to 25 moles per liter (M), such as from 4 to 20 M, including from 12.0 to 16.0 M, as well as any of the ranges provided for the aqueous capture ammonia provided above. The pH of the aqueous capture ammonia may vary, ranging in some instances from 10.0 to 13.0, such as 10.0 to 12.5. In some instances, e.g., where the aqueous capture ammonia is regenerated in a geomass mediated protocol that does not include input of energy, e.g., as described above, the regenerated aqueous capture ammonia may further include cations, e.g., divalent cations, such as $Ca^{2+}$. In addition, the regenerated aqueous capture ammonia may further include an amount of ammonium salt. In some instances, ammonia ($NH_3$) is present at a concentration ranging from 0.05 to 4 moles per liter (M), such as from 0.05 to 1 M, including from 0.1 to 2 M. The pH of the aqueous capture ammonia may vary, ranging in some instances from 8.0 to 11.0, such as from 8.0 to 10.0. The aqueous capture ammonia may further include ions, e.g., monovalent cations, such as ammonium ($NH_4^+$) at a concentration ranging from 0.1 to 5 moles per liter (M), such as from 0.1 to 2 M, including from 0.5 to 3 M, divalent cations, such as calcium ($Ca^{2+}$) at a concentration ranging from 0.05 to 2 moles per liter (M), such as from 0.1 to 1 M, including from 0.2 to 1 M, divalent cations, such as magnesium ($Mg^{2+}$) at a concentration ranging from 0.005 to 1 moles per liter (M), such as from 0.005 to 0.1 M, including from 0.01 to 0.5 M, divalent anions, such as sulfate ($SO_4^{2-}$) at a concentration ranging from 0.005 to 1 moles per liter (M), such as from 0.005 to 0.1 M, including from 0.01 to 0.5 M.

Aspects of the methods further include contacting the regenerated aqueous capture ammonia with a gaseous source of $CO_2$, e.g., as described above, under conditions sufficient to produce a $CO_2$ sequestering carbonate, e.g., as described above. In other words, the methods include recycling the regenerated ammonia into the process. In such instances, the regenerated aqueous capture ammonia may be used as the sole capture liquid, or combined with another liquid, e.g., make up water, to produce an aqueous capture ammonia suitable for use as a $CO_2$ capture liquid. Where the regenerated aqueous ammonia is combined with additional water, any convenient water may be employed. Waters of interest from which the aqueous capture ammonia may be produced include, but are not limited to, freshwaters, seawaters, brine waters, produced waters and waste waters.

Recycling

In some instances, the methods may include recirculating one or more of the reaction components from one stage of the process to another stage of the process. For example, as described above regenerated aqueous ammonia may be recycled to the $CO_2$ capture stage. Cation salts and/or aggregates produced during ammonia regeneration may be recycled to the carbonate production stage. Waste heat produced at one stage, e.g., $CO_2$ capture, may be employed at another stage, e.g., ammonia regeneration, e.g., as described above. The above are non-limiting examples of embodiments where recycling occurs.

Production of Pure $CO_2$ Gas

One or more stages of the methods may result in the production of pure $CO_2$ gas. For example, during the production of solid carbonate from the aqueous ammonium carbonate, up to one mol of $CO_2$ may be produced for every 2 mols of ammonium bicarbonate. Alternatively or in addition, the ammonia regeneration step may result in the production of waste $CO_2$. For example, during the ammonia regeneration step, waste $CO_2$ may come from fugitive $CO_2$ lost during heating or may come from alkalinity sources that contained embodied carbonate mineral. While such instances may result in the production of $CO_2$, the overall process sequesters a net amount of $CO_2$ in a carbonate compound. Any produced $CO_2$ may be substantially pure $CO_2$ product gas, which may be sequestered by injection into a subsurface geological location, as described in greater detail below. Therefore, the process is an effective $CO_2$ sequestration process. The phrase "substantially pure"

means that the product gas is pure $CO_2$ or is a $CO_2$ containing gas that has a limited amount of other, non-$CO_2$ components.

Following production of the $CO_2$ product gas in such embodiments, aspects of the invention may include injecting the product $CO_2$ gas into a subsurface geological location to sequester $CO_2$. By injecting is meant introducing or placing the $CO_2$ product gas into a subsurface geological location. Subsurface geological locations may vary, and include both subterranean locations and deep ocean locations. Subterranean locations of interest include a variety of different underground geological formations, such as fossil fuel reservoirs, e.g., oil fields, gas fields and un-mineable coal seams; saline reservoirs, such as saline formations and saline-filled basalt formations; deep aquifers; porous geological formations such as partially or fully depleted oil or gas formations, salt caverns, sulfur caverns and sulfur domes; etc.

In some instances, the $CO_2$ product gas may be pressurized prior to injection into the subsurface geological location. To accomplish such pressurization the gaseous $CO_2$ can be compressed in one or more stages with, where desired, after cooling and condensation of additional water. The modestly pressurized $CO_2$ can then be further dried, where desired, by conventional methods such as through the use of molecular sieves and passed to a $CO_2$ condenser where the $CO_2$ is cooled and liquefied. The $CO_2$ can then be efficiently pumped with minimum power to a pressure necessary to deliver the $CO_2$ to a depth within the geological formation or the ocean depth at which $CO_2$ injection is desired. Alternatively, the $CO_2$ can be compressed through a series of stages and discharged as a super critical fluid at a pressure matching that necessary for injection into the geological formation or deep ocean. Where desired, the $CO_2$ may be transported, e.g., via pipeline, rail, truck or other suitable protocol, from the production site to the subsurface geological formation.

In some instances, the $CO_2$ product gas is employed in an enhanced oil recovery (EOR) protocol. Enhanced Oil Recovery (abbreviated EOR) is a generic term for techniques for increasing the amount of crude oil that can be extracted from an oil field. Enhanced oil recovery is also called improved oil recovery or tertiary recovery. In EOR protocols, the $CO_2$ product gas is injected into a subterranean oil deposit or reservoir.

In some embodiments, the $CO_2$ product gas is recovered by contact with aqueous capture ammonia, e.g., as described above, to produce a solid $CO_2$ sequestering carbonate, e.g., as described above. For example, the $CO_2$ product gas from one stage of a method may be combined with fugitive aqueous capture ammonia vapor from another, separate stage of a method, to produce aqueous ammonium carbonate that is used in a different stage of a method to produce a solid $CO_2$ sequestering carbonate, e.g., as described above.

$CO_2$ gas production and sequestration thereof are further described in U.S. application Ser. No. 14/861,996 published as US 2016-0082387 A1 and now issued as U.S. Pat. No. 10,197,747, the disclosure of which is herein incorporated by reference.

Alkali Enrichment

In some instances, the methods further include subjecting the aqueous ammonium carbonate to an alkali enrichment protocol, e.g., a membrane mediated protocol, such as one that includes contacting first and second liquids to opposite sides of a membrane. In such instances, the membrane may be a cationic membrane or an anionic membrane. Further details regarding alkali enrichment protocols, such as membrane mediated alkali enrichment protocols, are described in U.S. Pat. No. 9,707,513; the disclosure of which is herein incorporated by reference. In some such instances, the methods include contacting the aqueous capture ammonia with the gaseous source of $CO_2$ in a combined capture and alkali enrichment reactor, where the reactor may include: a core hollow fiber membrane component, e.g., one that includes a plurality of hollow fiber membranes; an alkali enrichment membrane component surrounding the core hollow fiber membrane component and defining a first liquid flow path in which the core hollow fiber membrane component is present; and a housing configured to contain the alkali enrichment membrane component and core hollow fiber membrane component, wherein the housing is configured to define a second liquid flow path between the alkali enrichment membrane component and the inner surface of the housing. In such instances, the alkali enrichment membrane component may be configured as a tube and the hollow fiber membrane component is axially positioned in the tube. In such instances, the housing may be configured as a tube, wherein the housing and the alkali enrichment membrane component are concentric.

Recycling Demolished and Remediated Concrete

In some aspects of the invention, the methods further include providing calcium and/or alkalinity into one or more steps of the process from demolished or returned concrete geomass for carbon sequestration and utilization through calcium carbonate mineralization and use of the residual or remediated concrete as a favorable aggregate in new concrete after the partial dissolution of recycled concrete geomass material. Geomass or geomass material, as used herein, refers to concrete that has been returned from a job site or demolished and crushed after its service life or other reasons. Though generally, geomass is most commonly a waste product from industry, geomass may also refer to primary, secondary, tertiary, byproduct or other product from industry. Some example general trade names of geomass materials from industry may include mine tailings, mining dust, sand, baghouse fines, soil dust, dust, cement kiln dust, slag, steel slag, iron slag, boiler slag, coal combustion residue, ash, fly ash, slurry, lime slurry, lime, kiln dust, kiln fines, residue, bauxite residue, demolished concrete, returned concrete, crushed concrete, recycled concrete, recycled mortar, recycled cement, demolished building materials, recycled building materials, recycled aggregate, etc. Geomass materials typically have compositions that contain metal oxides, as crystalline or amorphous phases, such as sodium oxide, potassium oxide, or other alkali metal oxide, magnesium oxide, calcium oxide, or other alkaline earth metal oxide, manganese oxide, copper oxide, or other transition metal oxide, zinc oxide or any other metal oxide or derivative thereof, or metal oxides present in crystalline form in simple or complex minerals or as amorphous phases of metal oxides or derivatives thereof or as a combination of any of the above.

Embodiments described herein include methods of reducing transportation distance of aggregate by recycling demolished concrete and using the residual material remaining after geomass dissolution as aggregate in new concrete. The use of remediated concrete geomass as aggregate in new concrete reduces both the price and carbon footprint associated with the concrete. For example, if a concrete geomass contains 60% by weight calcium oxide (CaO) cement, and the cement is 10% of the concrete geomass, then 100% dissolution efficiency of CaO would result in 6% of the mass of the concrete geomass being dissolved for carbon capture and utilization, leaving the remaining 94% for utilization as recycled aggregate in new concrete, using the methods of invention. As such, aspects of the subject methods include dissolution efficiency of metal oxides present in the geomass to 0.05% or greater, such as 1.1% or greater, e.g., 2.1% or greater, 3.1% or greater, 4.1% or greater, 5.1% or greater, 6.1% or greater, 7.1% or greater, 8.1% or greater, 9.1% or greater, including 10% or greater, 20% or greater, 30% or greater, 40% or greater, 50% or greater, 60% or greater, 70% or greater, 80% or greater, 90% or greater and up to 100% dissolution efficiency. Additional aspects of embodiments the subject methods include liberating as individual particles present in the concrete geomass to 0.05% or greater, such as 1.1% or greater, e.g., 2.1% or greater, 3.1% or greater, 4.1% or greater, 5.1% or greater, 6.1% or greater, 7.1% or greater, 8.1% or greater, 9.1% or greater, including 10% or greater, 20% or greater, 30% or greater, 40% or greater, 50% or greater, 60% or greater, 70% or greater, 80% or greater, 90% or greater and up to 100% of the original sand and gravel aggregates in the demolished concrete in a form similar to their original virgin characteristic, useful in concrete, unlike mechanically crushed and classified recycled concrete.

Aspects of the methods include utilizing the remediated concrete aggregate as a substrate for applying a carbonate mineral coating derived from capture carbon dioxide for permanent sequestration in the mineral phase, e.g., as described above, creating a composite aggregate useful as an aggregate for concrete. This method of obtaining a substrate for the mineral coating similarly has the advantage of avoiding mining and transportation of fresh virgin aggregate.

Aspects of the methods include formulating concrete, mortar, and asphalt using the remediated residual concrete aggregate materials, either alone or coated with a $CO_2$ sequestered carbonate mineral. The amount of remediated coated or uncoated aggregate particles in the concrete, mortar, or asphalt may be present in the amounts of to 0.05% or greater, such as 1.1% or greater, e.g., 2.1% or greater, 3.1% or greater, 4.1% or greater, 5.1% or greater, 6.1% or greater, 7.1% or greater, 8.1% or greater, 9.1% or greater, including 10% or greater, 20% or greater, 30% or greater, 40% or greater, 50% or greater, 60% or greater, 70% or greater, 80% or greater, 90% or greater and up to 100% of the original sand and gravel aggregates in the concrete, mortar, or asphalt in a form similar to their original virgin characteristic, useful in concrete, unlike mechanically crushed and classified recycled concrete.

The dissolution of a variety of concrete and mortar materials may be useful and the residual remediated aggregate may be used in a large array of building material application, including all the uses of mined aggregates. Concrete and mortar materials, and any materials comprising Portland cement are of interest including at least those materials coming from roadways, buildings, dams, bridges, sidewalks, piping, culverts, water conductance systems, well casings, and the like.

Demolished concrete may be obtained from a variety of different sources, including but not limited to buildings, roads, pavements, sidewalks, barriers, and other structures. The source of returned concrete may come from a variety of sources, including but not limited to the ready-mix concrete trucks returning to their plant from a job site with unused or returned concrete. The source may be demolished using any convenient protocol to produce demolished geomass. The demolished geomass may then be employed in one or more stages of a $CO_2$ sequestering solid carbonate production process, e.g., as described above, to produce one or more types of products, including remediated building compositions, which may be employed in a variety of markets, including construction markets.

Demolished concrete may be obtained from a variety of different sources, including but not limited to buildings, roads, pavements, sidewalks, barriers, and other structures. The source may be demolished using any convenient protocol to produce demolished geomass. The demolished geomass may then be employed in one or more stages of a $CO_2$ sequestering solid carbonate production process, e.g., as described above, to produce one or more types of products, including remediated building compositions, which may be employed in a variety of markets, including construction markets. In this embodiment, the remediated building composites are recycled to new building composites, which may be incorporated into existing building composites as desired.

The above described embodiment of recycling demolished and/or returned and remediated concrete is not limited to particular gaseous sources of $CO_2$. Instead, the above described embodiment of recycling demolished and remediated concrete may be employed with processes employing any convenient gaseous source of $CO_2$, such as waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants, where methods employing such sources are further described in: U.S. application Ser. No. 14/204,994 published as US-2014-0322803-A1; 14/214,129 published as US 2014-0271440 A1; Ser. No. 14/861,996 published as US 2016-0082387 A1; as well as U.S. Pat. Nos. 9,707,513; 9,714,406 and 9,993,799; the disclosures of which are herein incorporated by reference.

Enhanced Geomass Dissolution Methods

Where the methods include dissolving geomass, e.g., as described above, aspects of the methods may include enhancing the dissolution of geomass, where a geomass and a liquid phase are combined in a system under conditions sufficient to produce a desired dissolution efficiency. Aspects of these embodiments further include systems configured to produce dissolved geomass compositions, and methods and devices that include the same. Also provided are methods that use dissolved geomass compositions.

As reviewed above, geomass or geomass material, as used herein, refers to industry products from industries such as mining industry, power industry, and heavy industry. Though most commonly a waste product from industry, geomass may also refer to primary, secondary, tertiary, byproduct or other product from industry. Some example trade names of geomass materials from industry may include mine tailings, mining dust, sand, bag house fines, soil dust, dust, cement kiln dust, slag, steel slag, iron slag, boiler slag, coal combustion residue, coal combustion product, ash, fly ash, slurry, lime slurry, lime, carbide lime, carbide residue, kiln dust, kiln fines, residue, bauxite residue, demolished concrete, recycled concrete, returned concrete, recycled mortar, recycled cement, demolished building materials, recycled building materials, recycled aggregate, etc. Geomass materials typically have compositions that contain metal oxides, as crystalline or amorphous phases, such as sodium oxide, potassium oxide, or other alkali metal oxide, magnesium oxide, calcium oxide, or other alkaline earth metal oxide, manganese oxide, copper oxide, or other transition metal oxide, zinc oxide or any other metal oxide or derivative thereof, or metal oxides present in crystalline form in simple or complex minerals or as amorphous phases of metal oxides or derivatives thereof or as a combination of any of the above.

As the methods are methods of enhancing geomass dissolution, the methods result in the leaching, seeping, straining, liberation, etc., of metal oxides or minerals from the geomass into a liquid phase such as an aqueous phase or an organic phase or as a combination of any other liquid phases, up to 100% dissolution efficiency of the desired metal oxides present in the composition of the geomass (as compared to a suitable control, e.g., the geomass material not subjected to methods of invention). For example, if a geomass contains 25% by weight calcium oxide (CaO), then 100% dissolution efficiency of CaO would result in 25% of the mass of the geomass being dissolved using the methods of invention. As such, aspects of the subject methods include dissolution efficiency of metal oxides present in the geomass to 0.05% or greater, such as 1.1% or greater, e.g., 2.1% or greater, 3.1% or greater, 4.1% or greater, 5.1% or greater, 6.1% or greater, 7.1% or greater, 8.1% or greater, 9.1% or greater, including 10% or greater, 20% or greater, 30% or greater, 40% or greater, 50% or greater, 60% or greater, 70% or greater, 80% or greater, 90% or greater and up to 100% dissolution efficiency.

In some embodiments, the methods use microwave radiation to enhance the dissolution efficiency of a geomass. Microwaves, microwave radiation, microwave energy, etc., are a form of non-ionizing electromagnetic radiation energy with wavelengths ranging from one meter (1 m) to one millimeter (1 mm), a frequency higher than ordinary radio waves but lower than infrared light, with frequencies that range, e.g., from 300 megahertz (MHz) to 300 gigahertz (GHz). Microwave radiation has been investigated to improve dissolution efficiency in order to improve overall yield and process time. Microwave radiation offers advantages over conventional heating that involve, non-contact heating, transfer of energy (not heat), rapid heating, material selective heating, volumetric heating, quick starting and stopping of heating, heating starting from interior, and improved safety. The microwave radiation that is employed in methods of the invention may vary according to process specificity, so long as it provides the desired enhancement in dissolution efficiency of the geomass. By microwaves, microwave radiation, microwave energy, etc., is meant a form of energy with frequencies that vary, and in some instances may range from 500 MHz to 100 GHz, such as 900 MHz to 5 GHz and including from 300 MHz to 300 GHz or the full microwave spectrum of frequencies. The methods use microwaves, microwave radiation, microwave energy, etc., to provide the power necessary to enhance the dissolution efficiency of the geomass, which may vary, and in some instances may range from one watt (1 W) to one gigawatt (1 GW), such as one kilowatt (1 kW) to one megawatt (1 MW) and including from 500 kW to 500 MW.

Aspects of the methods include microwave treatment of a combination of geomass material with a liquid phase to enhance the dissolution efficiency of the geomass. The treatment may occur, but is not limited to occurring in, a vessel or device that operates continuously, in batch, or a combination thereof. In certain embodiments, the geomass materials are present as particles that vary in size, e.g., with particle sizes ranging from 0.1 microns to several inches in diameter, e.g., 1 micron to 20 inches, or 100 microns to 10 inches, or 500 microns to 20 inches, in some embodiments 25 microns to ⅜ inches. In some embodiments, the liquid phase used in the methods is an aqueous medium, an organic medium, a combination thereof, or any other liquid medium that helps to promote the enhanced dissolution efficiency of the geomass using methods, systems and devices herein.

As the methods are methods of enhanced geomass dissolution efficiency, the microwave treatment or dielectric heating mechanism of enhancement is considered as methods, systems and devices described herein. The rate of geomass materials dissolution involves the surface area, the composition of the geomass itself, which may be comprised of many different mineral phases, and the temperature of the system, which may depend on the penetration of microwave radiation, effectiveness of dielectric heating, etc. Dielectric heating is a method in which a high frequency alternating electric field or radiofrequency or microwave electromagnetic radiation heats a material with dielectric properties. Dielectric heating is enhanced by materials with a dipole moment that are capable of molecular rotation, i.e., $H_2O$, molecules with carboxylic acid or carboxylate groups such as, but not limited to acetate, oxalate, glutamate, malate or other organic or natural carboxylic acid or carboxylate containing molecule. Molecules attempt to reorient themselves in the electric field and cannot respond to friction, therefore creating a stronger heating effect. The stronger heating effect described in this method is a localized method that enhances the dissolution of the different phases contained in the geomass.

The heating effect caused by microwave radiation in the enhanced methods described herein may also lower the heat requirements for a carbon sequestration method that uses the enhanced dissolution methods as part of its process to capture and sequester carbon dioxide. For example, the enhanced methods may reduce the auxiliary power requirement for carbon sequestration methods, reducing the parasitic load associated with the auxiliary power requirement. The enhanced dissolution methods may lower or even reduce the need for a heat source such as heat from steam or heat from electrical power that are sometimes necessary to drive carbon sequestration methods, devices and systems.

Instead of or in addition to use of microwaves, e.g., as described above, enhancement of dissolution efficiency of geomass material may involve mixing or heating the geomass material in a liquid phase that contains ammonium salts, acidic media, surfactants or catalysts that can be regenerated in a batch or continuous flow process.

Dissolution efficiency described in this method can be enhanced by liquid phase solutions containing organic or inorganic materials with a dipole moment that ranges between 0 and 80 Debye, such as materials with a dipole moment of 0.01 Debye or greater, 0.1 Debye or greater, 1.0 Debye or greater such as a dipole moment that ranges between 0.5 and 0.9 Debye, and including materials with a dipole moment of 2.0 Debye or greater, 3.0 Debye or greater, 4.0 Debye or greater. The solution employed in this method may further include a catalyst, an organic ligand, or a surfactant. The solution employed may contain an organic salt or organic acid with a dipole moment to enhance dielectric heating efficiency of heating. The solution may be optimized to reduce reflection that decreases the efficiency of the microwave energy penetration. The solution in this method is optimized to generate a homogenous temperature, which improves the heating efficiency of the solution and dissolution efficiency of this material.

The dissolution of a variety of geomass materials may be enhanced. Geomass materials of interest include at least those materials coming from power industry, heavy industry and mining industry.

Geomass generated as a waste product in the production of primary industry products (e.g., mined minerals, electricity, steel, cement, alumina) from a variety of industries (e.g., the mining industry, power industry, heavy industry) is dissolved using an enhanced dissolution method, e.g., a microwave mediated dissolution method, such as described above. The dissolved geomass and mother liquor may then be employed in one or more stages of a $CO_2$ sequestering solid carbonate production process, e.g., as described above, to produce one or more types of solid carbonate products, which may be employed in a variety of markets, including construction markets. As illustrated, the mother liquor may be recycled into the dissolution method, as desired. Undissolved geomass may also be employed in construction markets, e.g., as aggregate, etc.

The above described embodiment of enhancing geomass dissolution is not limited to embodiments particular gaseous sources of $CO_2$. Instead, the above described embodiment of geomass dissolution may be employed with processes employing any convenient gaseous source of $CO_2$, such as waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants, where methods employing such sources are further described in: U.S. application Ser. No. 14/204,994 published as US-2014-0322803-A1; 14/214,129 published as US 2014-0271440 A1; Ser. No. 14/861,996 published as US 2016-0082387 A1; as well as U.S. Pat. Nos. 9,707,513; 9,714,406; 9,993,799; the disclosures of which are herein incorporated by reference.

Systems

Aspects of the invention further include systems for sequestering $CO_2$ from a gaseous source of $CO_2$ via a protocol such as described above. A system is an apparatus that includes functional modules or reactors, e.g., as described above, that are operatively coupled in a manner sufficient to perform methods of the invention, e.g., as described above. In some embodiments, aspects of such systems include: a $CO_2$ gas/aqueous capture module and a carbonate production module. In some embodiments, aspects of such systems include a combine $CO_2$ gas/aqueous capture module carbonate production module. In some instances, the systems include one or more of an aqueous capture ammonia module; a carbonate production module; and an aqueous capture ammonia regeneration module.

In some instances, the $CO_2$ gas/aqueous capture ammonia module comprises a hollow fiber membrane contactor. In some instances, the $CO_2$ gas/aqueous capture ammonia module comprises a regenerative froth contactor. In some instances, the $CO_2$ gas/aqueous capture ammonia module contains a combination of contactors, e.g., as described above, in different arrangements. In some instances, the system is operatively coupled to a gaseous source of $CO_2$. As described above, the gaseous source of $CO_2$ may be a multi-component gaseous stream, such as a flue gas.

Operably coupled to the $CO_2$ gas/aqueous capture ammonia module is a carbonate production module. Embodiments of modules include continuous reactors that are configured for producing $CO_2$ sequestering carbonate materials. As the systems include continuous reactors (i.e., flow reactors), they include reactors in which materials are carried in a flowing stream, where reactants (e.g., divalent cations, aqueous bicarbonate rich liquid, etc.) are continuously fed into the reactor and emerge as continuous stream of product. The continuous reactor components of the systems are therefore not batch reactors. A given system may include the continuous reactors, e.g., as described herein, in combination with one or more additional elements, as described in greater detail below.

In some embodiments, continuous reactors of the systems include: a flowing aqueous liquid, e.g., an aqueous ammonium carbonate; a divalent cation introducer configured to introduce divalent cations at an introduction location into the flowing aqueous liquid; and a non-slurry solid phase $CO_2$ sequestering carbonate material production location which is located at a distance from the divalent cation introducer. The flowing aqueous liquid is a stream of moving aqueous liquid, e.g., as described above, which may be present in the continuous reactor, where the continuous reactor may have any convenient configuration. Continuous reactors of interest include an inlet for a liquid and an outlet for the waste liquid, where the inlet and outlet are arranged relative to each other to provide for continuous movement or flow of the liquid into and out of the reactor. The reactor may have any convenient structure, where in some instances the reactor may have a length along which the liquid flows that is longer than any given cross sectional dimension of the reactor, where the inlet is at a first end of the reactor and the outlet is at a second end of the reactor. The volume of the reactor may vary, ranging in some instances from 10 L to 1,000,000 L, such as 1,000 L to 100,000 L.

Continuous reactors of interest further include a divalent cation introducer configured to introduce divalent cations at an introduction location into the flowing aqueous liquid. Any convenient introducer may be employed, where the introducer may be a liquid phase or solid phase introducer, depending on the nature of the divalent cation source. The introducer may be located in some instances at substantially the same, if not the same, position as the inlet for the bicarbonate rich product containing liquid. Alternatively, the introducer may be located at a distance downstream from the inlet. In such instances, the distance between the inlet and the introducer may vary, ranging in some embodiments from 1 cm to 10 m, such as 10 cm to 1 m. The introducer may be operatively coupled to a source or reservoir of divalent cations.

Continuous reactors of interest also include a non-slurry solid phase $CO_2$ sequestering carbonate material production location. This location is a region or area of the continuous reactor where a non-slurry solid phase $CO_2$ sequestering carbonate material is produced as a result of reaction of the divalent cations with bicarbonate ions of the bicarbonate rich product containing liquid. The reactor may be configured to produce any of the non-slurry solid phase $CO_2$ sequestering carbonate materials described above in the production location. In some instances, the production location is located at a distance from the divalent cation introduction location. While this distance may vary, in some instances the distance between the divalent cation introducer and the material production location ranges from 1 cm to 10 m, such as 10 cm to 1 m.

The production location may include seed structure(s), such as described above. In such instances, the reactor may be configured to contact the seed structures in a submerged or non-submerged format, such as described above. In non-submerged formats, the flowing liquid may be present on the surface of seed structures as a layer, e.g., of varying thickness, but a gas, e.g., air, separates at least two portions of the seed structure, e.g., two different particles, such that the particles are not submerged in the liquid.

Further details regarding such reactors that may be employed as carbonate production modules in embodiments of the present systems are provide in U.S. Pat. No. 9,993, 799; the disclosure of which is herein incorporated by reference.

The aqueous capture ammonia regeneration module may vary so long it is configured to produce ammonia from the aqueous ammonium salt, e.g., via distillation or electrolysis, or through a process that does not introduce energy, such as described above. In some instances, the regeneration module will be configured to operate a sub-atmospheric pressure, e.g., as described above, such that it will include one or more components for producing sub-atmospheric pressure, e.g., pumps, etc. In some instances, the regeneration module is operably coupled to a source of generated heat, e.g., steam, and/or one or more sources of waste heat, e.g., as described above. In some embodiments, the regeneration module includes a source of alkalinity, such as a mineral alkali source, e.g., as described above.

In some instances, the system is configured to recycle regenerated aqueous capture ammonia to the $CO_2$ gas/aqueous capture ammonia module, e.g., as described above.

In some instances, the systems and modules thereof are industrial scale systems, by which is meant that they are configured to process industrial scale amounts/volumes of input compositions (e.g., gases, liquids, solids, etc.). For example, the systems and modules thereof, e.g., $CO_2$ contactor modules, carbonate production modules, ammonia regeneration modules, etc., are configured to process industrial scale volumes of liquids, e.g., 1,000 gal/day or more, such as 10,000 gal/day or more, including 25,000 gal/day or more, where in some instances, the systems and modules thereof are configured to process 1,000,000,000 gal/day or less, such as 500,000,000 gal/day or less. Similarly, the systems and modules thereof, e.g., $CO_2$ contactor modules, etc., are configured to process industrial scale volumes of gases, e.g., 25,000 cubic feet/hour or more, such as 100,000 cubic feet/hour or more, including 250,000 cubic feet/hour or more, where in some instances, the systems and modules thereof are configured to process 500,000,000 cubic feet/hour or less, such as 100,000,000 cubic feet/hour or less.

In some embodiments, a system is in fluidic communication with a source of aqueous media, such as a naturally occurring or man-made source of aqueous media, and may be co-located with a location where a $CO_2$ sequestration protocol is conducted. The systems may be present on land or sea. For example, a system may be a land based system that is in a coastal region, e.g., close to a source of sea water, or even an interior location, where water is piped into the system from a salt water source, e.g., an ocean. Alternatively, a system may be a water based system, i.e., a system that is present on or in water. Such a system may be present on a boat, ocean-based platform etc., as desired. In certain embodiments, a system may be co-located with an industrial plant, e.g., a power plant, at any convenient location.

In addition to the above components, systems of the invention further include a source of $CO^2$ containing gas, which component generates $CO_2$ containing gas that is introduced into the aqueous capture module, e.g., as described above.

FIG. 1 provides a schematic representation of a system according to an embodiment of the invention. As illustrated in FIG. 1, system 100 includes a $CO_2$ gas/aqueous capture liquid module 102; a $CO_2$ sequestering carbonate production module 104; and an aqueous capture liquid regeneration module 106. System 100 is configured so that $CO_2$ containing gas 108 from a gaseous $CO_2$ source, e.g., ambient air 109, is combined with aqueous capture ammonia liquid 122 in the $CO_2$ gas/aqueous capture ammonia module 102 so as to produce an aqueous ammonium carbonate liquid 110 which is then conveyed to the fluidically coupled $CO_2$ sequestering carbonate production module 104. In the $CO_2$ sequestering carbonate production module 104, the aqueous ammonium carbonate liquid 110 is combined with a cation liquid 112 under conditions sufficient to produce a solid $CO_2$ sequestering carbonate 114 and an aqueous ammonium salt liquid 116. The aqueous ammonium salt liquid 116 is then conveyed to the fluidically coupled aqueous capture liquid regeneration module 106, where it is heated, e.g., by process steam 120, in the presence of a geomass, e.g., construction and demolition waste (C&DW) 118. Regenerated aqueous capture liquid 122 is then conveyed to fluidically coupled $CO_2$ gas/aqueous capture liquid module 102.

Figure 2:
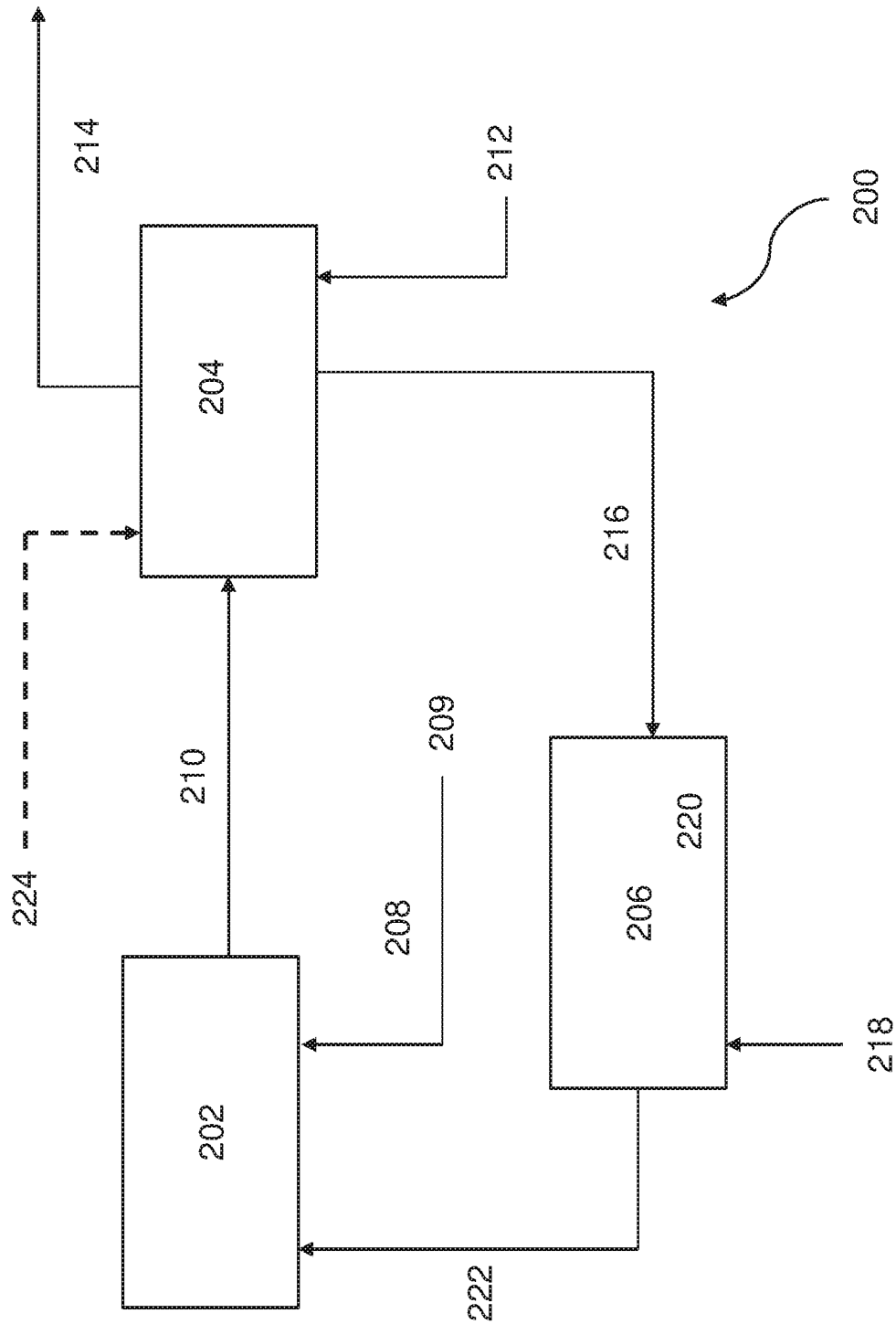
FIG. 2 provides a schematic representation of a system according to an embodiment of the invention, where $CO_2$ sequestering carbonate production takes place in the presence of an additive, and the aqueous capture liquid regeneration module is driven by renewable energy.

FIG. 2 provides a schematic representation of a system according to an embodiment of the invention. As illustrated in FIG. 2, system 200 includes a $CO_2$ gas/aqueous capture liquid module 202; a $CO_2$ sequestering carbonate production module 204; and an aqueous capture liquid regeneration module 206. System 200 is configured so that $CO_2$ containing gas 208 from a gaseous $CO_2$ source, e.g., flue gas 209 is combined with aqueous capture ammonia liquid 222 in the $CO_2$ gas/aqueous capture ammonia module 202 so as to produce an aqueous ammonium carbonate liquid 210 which is then conveyed to the fluidically coupled $CO_2$ sequestering carbonate production module 204. In the $CO_2$ sequestering carbonate production module 204, the aqueous ammonium carbonate liquid 210 is combined with a cation liquid 212 and an additive, e.g., polystyrene microspheres 224, under conditions sufficient to produce a solid $CO_2$ sequestering carbonate 214 and an aqueous ammonium salt liquid 216. The aqueous ammonium salt liquid 216 is then conveyed to the fluidically coupled aqueous capture liquid regeneration module 206, where it is heated, e.g., by a renewable energy source 220, in the presence of geomass, e.g., construction and demolition waste (C&DW) 218. Regenerated aqueous capture liquid 222 is then conveyed to fluidically coupled $CO_2$ gas/aqueous capture liquid module 202.

Figure 3:
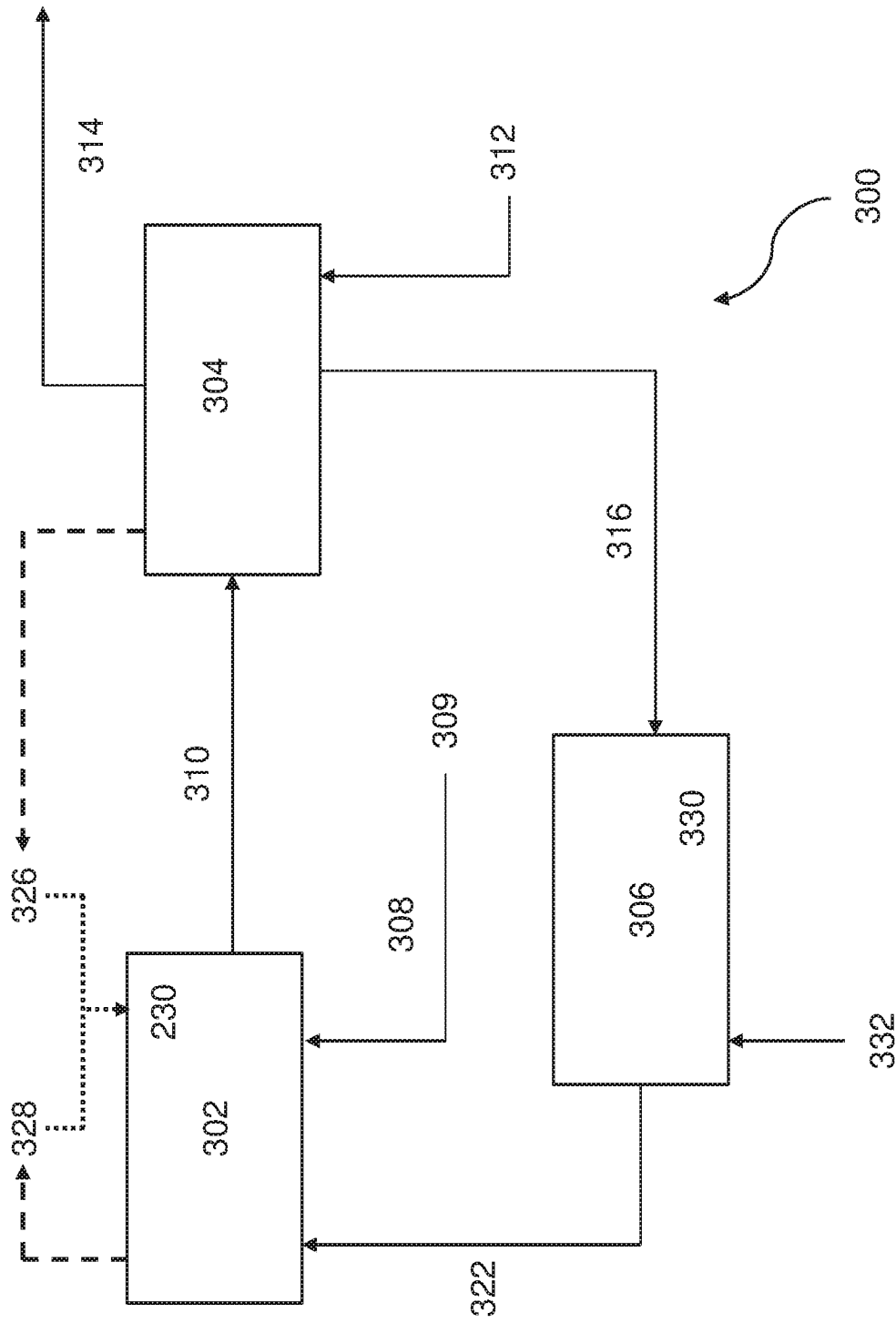
FIG. 3 provides a schematic representation of a system according to an embodiment of the invention, where additional $CO_2$ gas is coming from the $CO_2$ sequestering carbonate production module and is recovered by condensed fugitive ammonia vapor coming from the $CO_2$ gas/aqueous capture liquid module, and the aqueous capture liquid regeneration module is driven by waste heat from process steam condensate.

FIG. 3 provides a schematic representation of a system according to an embodiment of the invention. As illustrated in FIG. 3, system 300 includes a $CO_2$ gas/aqueous capture liquid module 302; a $CO_2$ sequestering carbonate production module 304; and an aqueous capture liquid regeneration module 306. System 300 is configured so that $CO_2$ containing gases 308 and 326 from gaseous $CO_2$ sources, e.g., flue gas 309 and $CO_2$ gas 326 produced from the production of a $CO_2$ sequestering carbonate in a $CO_2$ sequestering carbonate production module 304, are combined with aqueous capture ammonia liquids 322 and, e.g., a condensed fugitive ammonia vapor 328 from a $CO_2$ gas/aqueous capture liquid module 302, in the $CO_2$ gas/aqueous capture ammonia module 302 so as to produce an aqueous ammonium carbonate liquid 310 which is then conveyed to the fluidically coupled $CO_2$ sequestering carbonate production module 304. In the $CO_2$ sequestering carbonate production module 304, the aqueous ammonium carbonate liquid 310 is combined with a cation liquid 312 under conditions sufficient to produce a solid $CO_2$ sequestering carbonate 314 and an aqueous ammonium salt liquid 316. The aqueous ammonium salt liquid 316 is then conveyed to the fluidically coupled aqueous capture liquid regeneration module 306, where it is heated, e.g., by waste heat in the form of process steam condensate 330, in the presence of geomass, e.g., alkaline waste 332. Regenerated aqueous capture liquid 322 is then conveyed to fluidically coupled $CO_2$ gas/aqueous capture liquid module 302.

Figure 4:
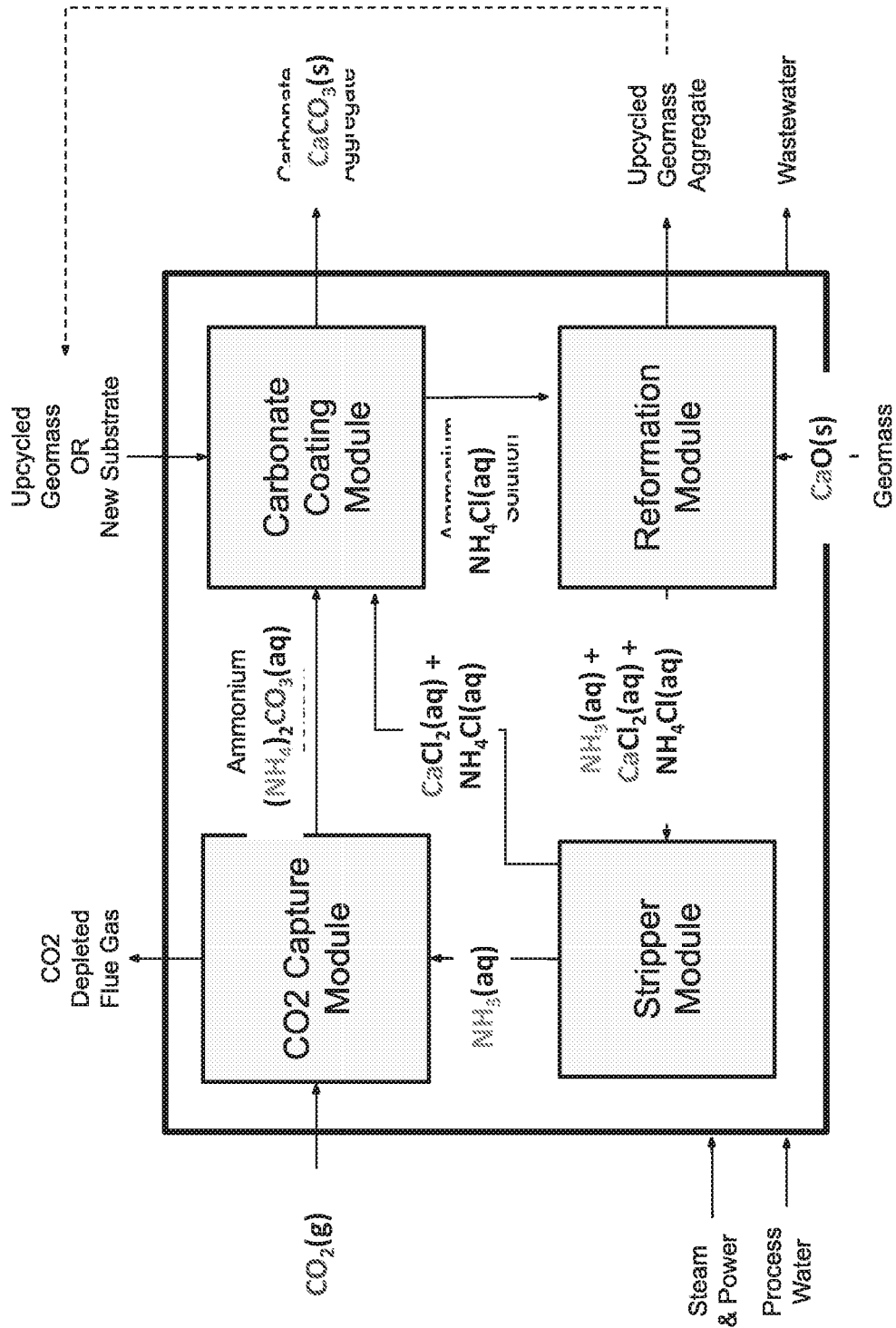
FIG. 4 provides a schematic representation of a system according to an embodiment of the invention.

FIG. 4 provides a schematic diagram of another embodiment of the invention. As shown in FIG. 4, $CO_2$ containing flue gas and aqueous ammonia ($NH_3$ (aq)) are combined in a $CO_2$ capture module, which results in the production of $CO_2$ depleted flue gas and aqueous ammonium carbonate $(NH_4)_2CO_3$(aq). The aqueous ammonium carbonate is then combine with aqueous calcium chloride ($CaCl_2$(a)) and aqueous ammonium chloride ($NH_4Cl$(aq)), as well as upcycled geomass (e.g., from a reformation module and or new aggregate substrate in a carbonate coating module, where calcium carbonate precipitates and coats the upcycled geomass and/or new aggregate substrate to produce an aggregate product that includes a coating of a $CO_2$ sequestering carbonate material. In addition to the aggregate product, the carbonate coating module yields aqueous ammonium salt, specifically aqueous ammonium chloride ($NH_4Cl$ (aq)), which aqueous ammonium salt is then conveyed to a reformation module. In the reformation module, the aqueous ammonium salt is combined with a solid geomass (CaO(s)) to yield geomass aggregate which may be upcycled and an initial regenerated aqueous ammonia liquid, which includes aqueous ammonia ($NH_3$ (aq)), aqueous calcium chloride ($CaCl_2$(aq)) and aqueous ammonium chloride ($NH_4Cl$(aq)). The initial regenerated aqueous ammonia liquid is then conveyed to a stripper module, where heat provided by steam is employed to still aqueous ammonia ($NH_3$ (aq)) capture liquid from the initial regenerated liquid. (It is noted that, in FIG. 4, chemical equations are not balanced and are for illustrative purposes only).

Figure 5:
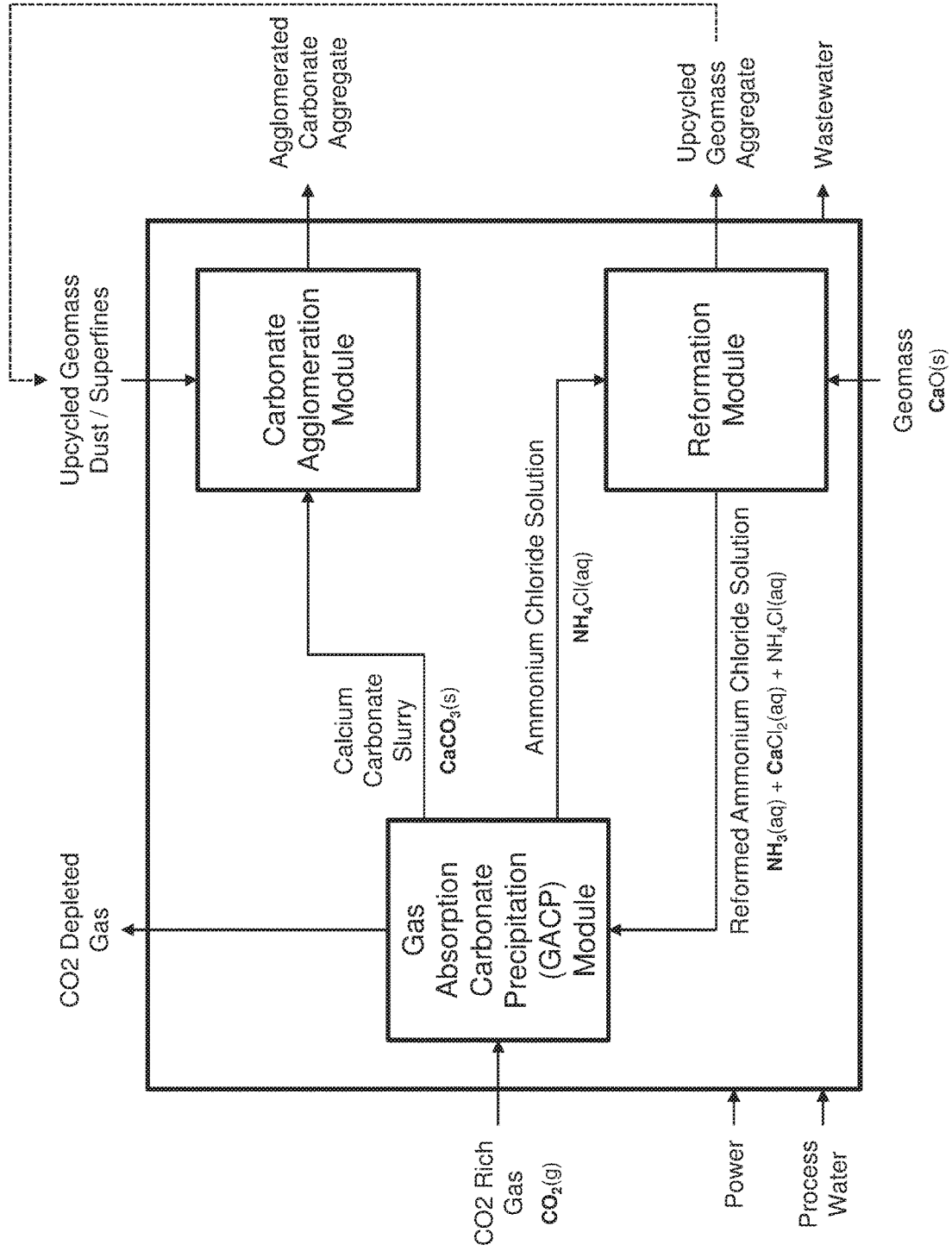
FIG. 5 provides a schematic representation of a system according to an embodiment of the invention, where the system does not include a stripper or other ammonia purification module.

FIG. 5 provides a schematic diagram of another embodiment of the invention in which no steam stripping or high-pressure systems are employed, such that the process depicted may be viewed as a cold process. As shown in FIG. 5, a $CO_2$ rich gas, such as flue gas, is combined with an aqueous ammonia ($NH_3$ (aq)) capture liquid that also includes aqueous calcium chloride ($CaCl_2$(aq)) and aqueous ammonium chloride ($NH_4Cl$(aq)) in a Gas Absorption Carbonate Precipitation (GACP) Module, which results in the production of $CO_2$ depleted gas and a calcium carbonate slurry ($CaCO_3$(s)). In the gas absorption carbonate precipitation (GACP) module, the suspension from the reformation module, either as an aqueous solution with suspended solids or as an aqueous solution free from solids, is contacted directly with a gaseous source of carbon dioxide ($CO_2$) thereby producing solid calcium carbonate ($CaCO_3$) inside the module. In the GACP module, the pH may be basic, in some instances 9 or higher, the aqueous ammonia (or alkalinity) concentration may be 0.20 mol/L or higher and the calcium ion concentration may be 0.10 mol/L or higher. The temperature in GACP may vary, in some instances ranging from 10 to 40, such as 15 to 35° C., where in some instances the temperature is ambient temperature or lower, ranging from 2 to 10, such as 2 to 5° C. In some instances the aqueous ammonia capture liquid feeding into the GACP module is cooled using a heat source, e.g., a waste heat source, such as hot flue gas from a power plant, and principles of adsorption or absorption, e.g., using an adsorption or absorption refrigerator or chiller that, with a heat source input, provide the energy needed to drive the cooling process. With respect to the calcium carbonate slurry produced by the GACP, in some instances, the slurry precipitated calcium carbonate has no detectable calcite morphology, and may be amorphous (ACC), vaterite, aragonite or other morphology, including any combination of such morphologies. The resultant calcium carbonate slurry is then conveyed to a carbonate agglomeration module, where it is combined with upcycled geomass (e.g., from a reformation module) and/or new aggregate substrate to produce an agglomerated aggregate product that includes a $CO_2$ sequestering carbonate material. In the carbonate agglomeration module, the $CaCO_3$ slurry from a GACP module is processed to produce aggregate rocks for concrete, either as pure $CaCO_3$ rocks or as a mixture of $CaCO_3$ and geomass dust/superfine material from a reformation module. In addition to the calcium carbonate slurry ($CaCO_3$(s)), the GACP module also produces aqueous ammonium chloride ($NH_4Cl$ (aq)), which aqueous ammonium chloride ($NH_4Cl$(aq)) is then conveyed to a reformation module. In the reformation module, the aqueous ammonium chloride ($NH_4Cl$(aq)) is combined with a solid geomass (CaO(s)) to yield geomass aggregate which may be upcycled and a regenerated aqueous ammonia liquid, which includes aqueous ammonia ($NH_3$ (aq)), aqueous calcium chloride ($CaCl_2$(a)) and aqueous ammonium chloride ($NH_4Cl$(aq)). In the reformation module, metal oxides, e.g., calcium oxide (CaO), are extracted by mixing geomass with an aqueous ammonium chloride ($NH_4Cl$) solution from a gas absorption carbonate precipitation (GACP) module, resulting in partial reformation of ammonium ($NH_4^+$) ions into aqueous ammonia ($NH_3$) and in dissolution of calcium ($Ca^{2+}$) ions from the geomass. The regenerated aqueous ammonia liquid is then conveyed to GACP module. (It is noted that, in FIG. 5, chemical equations are not balanced and are for illustrative purposes only). Where desired, e.g., to remove and recover chemical species, e.g., ammonium chloride ($NH_4Cl$), calcium ions, aqueous ammonia, etc., from the surfaces and pores of the reformed geomass and from the calcium carbonate ($CaCO_3$) slurry, the materials may be washed using one or more of the following techniques before final dewatering: (a) steaming, e.g., using low grade steam, waste heat from hot flue gas, etc., in a humidity chamber, etc.; (b) soaking, e.g., letting low salinity water diffuse into pores of aggregates so as to extract the desirable chemical species; (c) sonication, e.g., applying ultrasonic frequencies to continuous or batch processes so as to shock the aggregates into releasing desirable chemical species; and (d) chemical additions, e.g., using additives to chemically neutralize the aggregates.

In some instances, the $CO_2$ gas/aqueous capture ammonia module comprises a combined capture and alkali enrichment reactor, the reactor comprising: a core hollow fiber membrane component (e.g., one that comprises a plurality of hollow fiber membranes); an alkali enrichment membrane component surrounding the core hollow fiber membrane component and defining a first liquid flow path in which the core hollow fiber membrane component is present; and a housing configured to contain the alkali enrichment membrane component and core hollow fiber membrane component, wherein the housing is configured to define a second liquid flow path between the alkali enrichment membrane component and the inner surface of the housing. In some instances, the alkali enrichment membrane component is configured as a tube and the hollow fiber membrane component is axially positioned in the tube. In some instances, the housing is configured as a tube, wherein the housing and the alkali enrichment membrane component are concentric. Aspects of the invention further include a combined capture and alkali enrichment reactor, e.g., as described above.

In some instances the, the above protocols are carried out using a system of one or more shippable modular units configured for use in sequestering $CO_2$, e.g., as described in PCT published application No. WO 2016/160612; the disclosure of which is herein incorporated by reference. Aspects of the units include a support, e.g., a housing or base, having associated therewith one or more of: a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Modular units configured for use in the present invention may also include an ammonia regeneration unit, e.g., as described above. Also provided are systems made up of one or more such modular units. Systems disclosed herein include large capacity systems, where individual modular units may contain only one type or more of a given subunit, e.g., a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Aspects of the invention include larger assemblages of multiple individual modular units that are engaged and may have one or many individual modular units that include a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Also provided are methods of using the units/systems in $CO_2$ sequestration protocols.

Notwithstanding the appended claims, the disclosure is also defined by the following clauses:

1. A method of sequestering $CO_2$ from a gaseous source of $CO_2$, the method comprising:
   (a) contacting an aqueous ammonia capture liquid with a gaseous source of $CO_2$ under conditions sufficient to produce a $CO_2$ sequestering carbonate and an aqueous ammonium salt; and
   (b) combining the aqueous ammonium salt with a geomass to produce a regenerated aqueous ammonia capture liquid;
   to sequester $CO_2$ from the gaseous source of $CO_2$.
2. The method according to Clause 1, wherein step (a) comprises contacting the aqueous ammonia capture liquid with the gaseous source of $CO_2$ under conditions sufficient to produce an aqueous ammonium carbonate and then contacting the aqueous ammonium carbonate with a cation source to produce the $CO_2$ sequestering carbonate.
3. The method according to Clause 1, wherein step (a) comprises contacting the aqueous ammonia capture liquid that includes a cation source with the gaseous source of $CO_2$ under conditions sufficient to produce the $CO_2$ sequestering carbonate and the aqueous ammonium salt.
4. The method according to any of the preceding clauses, wherein the production of the $CO_2$ sequestering carbonate produces $CO_2$ gas.
5. The method according to Clause 4, wherein the produced $CO_2$ gas is recovered by contact with an aqueous capture ammonia liquid.
6. The method according to any of the preceding clauses, wherein the geomass comprises construction and demolition waste (C&DW).
7. The method according to any of Clauses 1 to 5, wherein the geomass comprises coal combustion products (CCPs).
8. The method according to any of Clauses 1 to 5, wherein the geomass comprises alkaline waste products.
9. The method according to any of the preceding clauses, wherein the method further comprises purification of the regenerated aqueous ammonia.
10. The method according to Clause 9, wherein the purification comprises stripping aqueous capture ammonia from the regenerated aqueous ammonia.
11. The method according to any of Clauses 1 to 8, wherein the method does not comprise purification of the regenerated aqueous ammonia.
12. The method according to any of the preceding clauses, wherein the gaseous source of $CO_2$ comprises flue gas.
13. The method according to any of the preceding clauses, wherein the method produces a $CO_2$ sequestering aggregate.
14. A system for sequestering $CO_2$ from a gaseous source of $CO_2$, the system comprising:
    (a) a $CO_2$ gas/aqueous capture liquid module; and
    (b) an aqueous capture liquid regeneration module coupled to a $CO_2$ sequestering carbonate production module.
15. The system according to Clause 14, wherein the system further comprises a $CO_2$ sequestering carbonate production module operatively coupled to a $CO_2$ gas/aqueous capture liquid module.
16. The system according to Clause 14, wherein the system does not include a $CO_2$ sequestering carbonate production module separate from the $CO_2$ gas/aqueous capture liquid module.
17. A method of sequestering $CO_2$ from a gaseous source of $CO_2$, the method comprising:
    contacting an aqueous capture ammonia liquid with a gaseous source of $CO_2$ under conditions sufficient to produce an aqueous ammonium carbonate liquid;
    combining a cation source with the aqueous ammonium carbonate liquid under conditions sufficient to produce a $CO_2$ sequestering carbonate and an ammonium salt liquid; and
    combining the ammonium salt liquid with a geomass to produce a regenerated aqueous ammonia capture liquid;
    to sequester $CO_2$ from the gaseous source of $CO_2$.
18. The method according to Clause 17, wherein the production of the $CO_2$ sequestering carbonate and ammonium salt liquid produces $CO_2$ gas.
19. The method according to Clause 18, wherein the produced $CO_2$ gas is recovered by contact with an aqueous capture ammonia liquid.
20. The method according to any of Clauses 17 to 19, wherein the geomass comprises construction and demolition waste (C&DW).
21. The method according to any of Clauses 17 to 19, wherein the geomass comprises coal combustion products (CCPs).
22. The method according to any of Clauses 17 to 19, wherein the geomass comprises alkaline waste products.

23. The method according to any of Clauses 17 to 22, wherein the method further comprises purification of the regenerated aqueous ammonia.

24. The method according to Clause 23, wherein the purification comprises stripping aqueous capture ammonia from the regenerated aqueous ammonia.

25. The method according to any of Clauses 17 to 24, wherein cation source comprises an alkaline earth metal cation.

26. The method according to Clause 25, wherein the cation source is a source of divalent cations.

27. The method according to Clause 26, wherein the divalent cations comprise alkaline earth metal cations.

28. The method according to Clause 27, wherein the divalent alkaline earth metal cations are selected from the group consisting of $Ca^{2+}$ and $Mg^{2+}$, and combinations thereof.

29. A system for sequestering $CO_2$ from a gaseous source of $CO_2$, the system comprising:
   (a) a $CO_2$ gas/aqueous capture liquid module; and
   (b) a $CO_2$ sequestering carbonate production module operatively coupled to a $CO_2$ gas/aqueous capture liquid module; and
   (c) an aqueous capture liquid regeneration module coupled to a $CO_2$ sequestering carbonate production module configured to regenerate aqueous capture liquid via a geomass mediated process.

30. A method of sequestering $CO_2$ from a gaseous source of $CO_2$, the method comprising:
   (a) contacting an aqueous ammonia capture liquid that includes a cation source with a gaseous source of $CO_2$ under conditions sufficient to produce a $CO_2$ sequestering carbonate and an aqueous ammonium salt; and
   (b) combining the aqueous ammonium salt with a geomass to produce a regenerated aqueous ammonia capture liquid;
   to sequester $CO_2$ from the gaseous source of $CO_2$.

31. The method according to any of the preceding clauses, wherein the production of the $CO_2$ sequestering carbonate produces $CO_2$ gas.

32. The method according to Clause 31, wherein the produced $CO_2$ gas is recovered by contact with an aqueous capture ammonia liquid.

33. The method according to any of Clauses 30 to 32, wherein the geomass comprises construction and demolition waste (C&DW).

34. The method according to any of Clauses 30 to 32, wherein the geomass comprises coal combustion products (CCPs).

35. The method according to any of Clauses 30 to 32, wherein the geomass comprises alkaline waste products.

36. The method according to any of Clauses 30 to 35, wherein the gaseous source of $CO_2$ comprises flue gas.

37. The method according to any Clauses 30 to 35, wherein the method produces a $CO_2$ sequestering aggregate.

38. A system for sequestering $CO_2$ from a gaseous source of $CO_2$, the system comprising:
   (a) a $CO_2$ gas capture and sequestering carbonate production module; and
   (b) an aqueous capture liquid regeneration module coupled to a $CO_2$ gas capture and sequestering carbonate production module.

39. The system according to Clause 38, wherein the system further comprises a $C_{O2}$ carbonate agglomeration module.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of sequestering $CO_2$ from a gaseous source of $CO_2$, the method comprising:
   (a) contacting an aqueous ammonia capture liquid with a gaseous source of $CO_2$ under conditions sufficient to produce a $CO_2$ sequestering carbonate and an aqueous ammonium salt; and
   (b) combining the aqueous ammonium salt with a geomass to produce a regenerated aqueous ammonia capture liquid;
   to sequester $CO_2$ from the gaseous source of $CO_2$,
   wherein the method does not comprise purification of the regenerated aqueous ammonia capture liquid.

2. The method according to claim 1, wherein step (a) comprises contacting the aqueous ammonia capture liquid with the gaseous source of $CO_2$ under conditions sufficient to produce an aqueous ammonium carbonate and then contacting the aqueous ammonium carbonate with a cation source to produce the $CO_2$ sequestering carbonate.

3. The method according to claim 1, wherein step (a) comprises contacting the aqueous ammonia capture liquid that includes a cation source with the gaseous source of $CO_2$ under conditions sufficient to produce the $CO_2$ sequestering carbonate and the aqueous ammonium salt.

4. The method according to claim 1, wherein the production of the $CO_2$ sequestering carbonate produces $CO_2$ gas.

5. The method according to claim 4, wherein the produced $CO_2$ gas is recovered by contact with an aqueous capture ammonia liquid.

6. The method according to claim 1, wherein the geomass comprises construction and demolition waste (C&DW).

7. The method according to claim 1, wherein the geomass comprises coal combustion products (CCPs).

8. The method according to claim 1, wherein the geomass comprises alkaline waste products.

9. The method according to claim 1, wherein the gaseous source of $CO_2$ comprises flue gas.

10. The method according to claim 1, wherein the method produces a $CO_2$ sequestering aggregate.

11. A method of sequestering $CO_2$ from a gaseous source of $CO_2$, the method comprising:
    (a) contacting an aqueous ammonia capture liquid with a gaseous source of $CO_2$ under conditions sufficient to produce a $CO_2$ sequestering carbonate and an aqueous ammonium salt; and
    (b) combining the aqueous ammonium salt with a geomass to produce a regenerated aqueous ammonia capture liquid, wherein the geomass comprises construction and demolition waste (C&DW);
    to sequester $CO_2$ from the gaseous source of $CO_2$,
    wherein the method further comprises purification of the regenerated aqueous ammonia.

12. The method according to claim 11, wherein the purification comprises stripping aqueous capture ammonia from the regenerated aqueous ammonia.

13. The method according to claim 11, wherein step (a) comprises contacting the aqueous ammonia capture liquid with the gaseous source of $CO_2$ under conditions sufficient to produce an aqueous ammonium carbonate and then contacting the aqueous ammonium carbonate with a cation source to produce the $CO_2$ sequestering carbonate.

14. The method according to claim 11, wherein step (a) comprises contacting the aqueous ammonia capture liquid that includes a cation source with the gaseous source of $CO_2$ under conditions sufficient to produce the $CO_2$ sequestering carbonate and the aqueous ammonium salt.

15. The method according to claim 11, wherein the production of the $CO_2$ sequestering carbonate produces $CO_2$ gas.

16. A method of sequestering $CO_2$ from a gaseous source of $CO_2$, the method comprising:
   contacting an aqueous capture ammonia liquid with a gaseous source of $CO_2$ under conditions sufficient to produce an aqueous ammonium carbonate liquid;
   combining a cation source with the aqueous ammonium carbonate liquid under conditions sufficient to produce a $CO_2$ sequestering carbonate and an ammonium salt liquid; and
   combining the aqueous ammonium salt liquid with a geomass to produce a regenerated aqueous ammonia capture liquid;
   to sequester $CO_2$ from the gaseous source of $CO_2$,
   wherein the method does not comprise purification of the regenerated aqueous ammonia capture liquid.

17. The method according to claim 16, wherein the production of the $CO_2$ sequestering carbonate and ammonium salt liquid produces $CO_2$ gas.

18. The method according to claim 17, wherein the produced $CO_2$ gas is recovered by contact with an aqueous capture ammonia liquid.

19. The method according to claim 16, wherein cation source comprises an alkaline earth metal cation.

* * * * *

UNITED STATES PATENT AND TRADEMARK OFFICE
CERTIFICATE OF CORRECTION

PATENT NO. : 11,946,343 B2
APPLICATION NO. : 17/261678
DATED : April 2, 2024
INVENTOR(S) : Quynh Nguyen et al.

Page 1 of 1

It is certified that error appears in the above-identified patent and that said Letters Patent is hereby corrected as shown below:

In the Specification

Please replace "10.00" with -- 10,00 -- (Column 6, Line 9).

Please replace "10.00" with -- 10,00 -- (Column 7, Line 13).

Please replace "lanfordite" with -- lansfordite -- (Column 11, Line 62).

Please replace "(CaMg)(CO$_3$)$_2$)," with -- (CaMg)(CO$_3$)$_2$, -- (Column 11, Line 65).

Please replace "(Ca$_2$Mg(CO$_3$)$_{13}$.H$_2$O)." with -- (Ca$_2$Mg$_{11}$(CO$_3$)$_{13}$.H$_2$O). -- (Column 11, Line 67).

Please replace "TI," with -- Tl, -- (Column 17, Line 5).

Please replace "BALLOTTINI" with -- BALLOTINI -- (Column 24, Line 65).

Please replace "CO$^2$" with -- CO$_2$ -- (Column 39, Line 67).

Please replace "C$_{02}$" with -- CO$_2$ -- (Column 46, Line 2).

Signed and Sealed this
Fourth Day of February, 2025

Coke Morgan Stewart
*Acting Director of the United States Patent and Trademark Office*